United States Patent

[11] 3,604,912

| [72] | Inventor | Millard M. Frohock, Jr. |
| --- | --- | --- |
| | | Thousand Oaks, Calif. |
| [21] | Appl. No. | 754,440 |
| [22] | Filed | Aug. 21, 1968 |
| [45] | Patented | Sept. 14, 1971 |
| [73] | Assignee | Hughes Aircraft Company |
| | | Culver City, Calif. |

[54] IN-LINE PARTIAL DERIVATIVE MULTIPLIER FOR COMPUTER CIRCUITS
8 Claims, 10 Drawing Figs.

[52] U.S. Cl. ..................................... 235/197,
235/61.5, 235/194, 307/229, 307/260
[51] Int. Cl. ........................................ G06g 7/28,
G06g 7/16
[50] Field of Search............................ 235/197,
193, 193.5, 194, 150.26, 150.27, 61.5

[56] References Cited
UNITED STATES PATENTS

| 3,077,557 | 2/1963 | Joline et al.................. | 235/193 X |
| 3,404,262 | 10/1968 | Udall............................ | 235/194 X |
| 3,466,460 | 9/1969 | Connolly...................... | 235/194 X |

*Primary Examiner*—Eugene G. Botz
*Assistant Examiner*—Felix D. Gruber
*Attorneys*—James K. Haskell and Robert Thompson ABSTRACT: A computer circuit for generating signals related to the ballistics of a plurality of projectile or ammunition types, the signals including time of flight, superelevation, and ballistics drift signals and a circuit including master-slave multipliers for multiplying selected generated signals by partial derivatives corresponding to nonstandard changes in standard conditions. Each slave multiplier includes a first circuit path that directly conducts a signal generated by the computer to a summing circuit and a second circuit path that multiplies the generated signal by the ratio of change in the standard condition to the standard condition and feeds this signal to the summing circuit where it is summed with the generated signal to produce a partial derivative output signal. More specifically, the computer includes a plurality of parallel channels, and a first adjustable operational amplifier which operates on the range information R by a selected ballistics-normalizing transfer function $1/R_n$ to generate an individual normalized range signal $R/R_n$ for a selected individual one of the plurality of projectile or ammunition types, a first multiplier means for multiplying the normalized range signal received from the operational amplifier by a partial derivative of nonstandard air pressure and temperature, each parallel channel including a function generator coupled to receive and operate on the normalized range signal with a nonlinear transfer function common to the ballistics of all of the projectile types for generating an exponential function signal related to the selected projectiles, and a second adjustable operational amplifier coupled to the function generator for operating on the function signal by a selected individual unnormalizing transfer function for each projectile for generating signals related to the ballistics of the projectile, such as superelevation and time of flight on each channel other multiplier means in each channel are coupled in series circuit relationship to multiply the superelevation signal and the time of flight signal by the partial derivative of nonstandard air temperature and air pressure conditions and by the partial derivative of nonstandard propellant grain temperature and effective full charge to correct for changes in standard conditions.

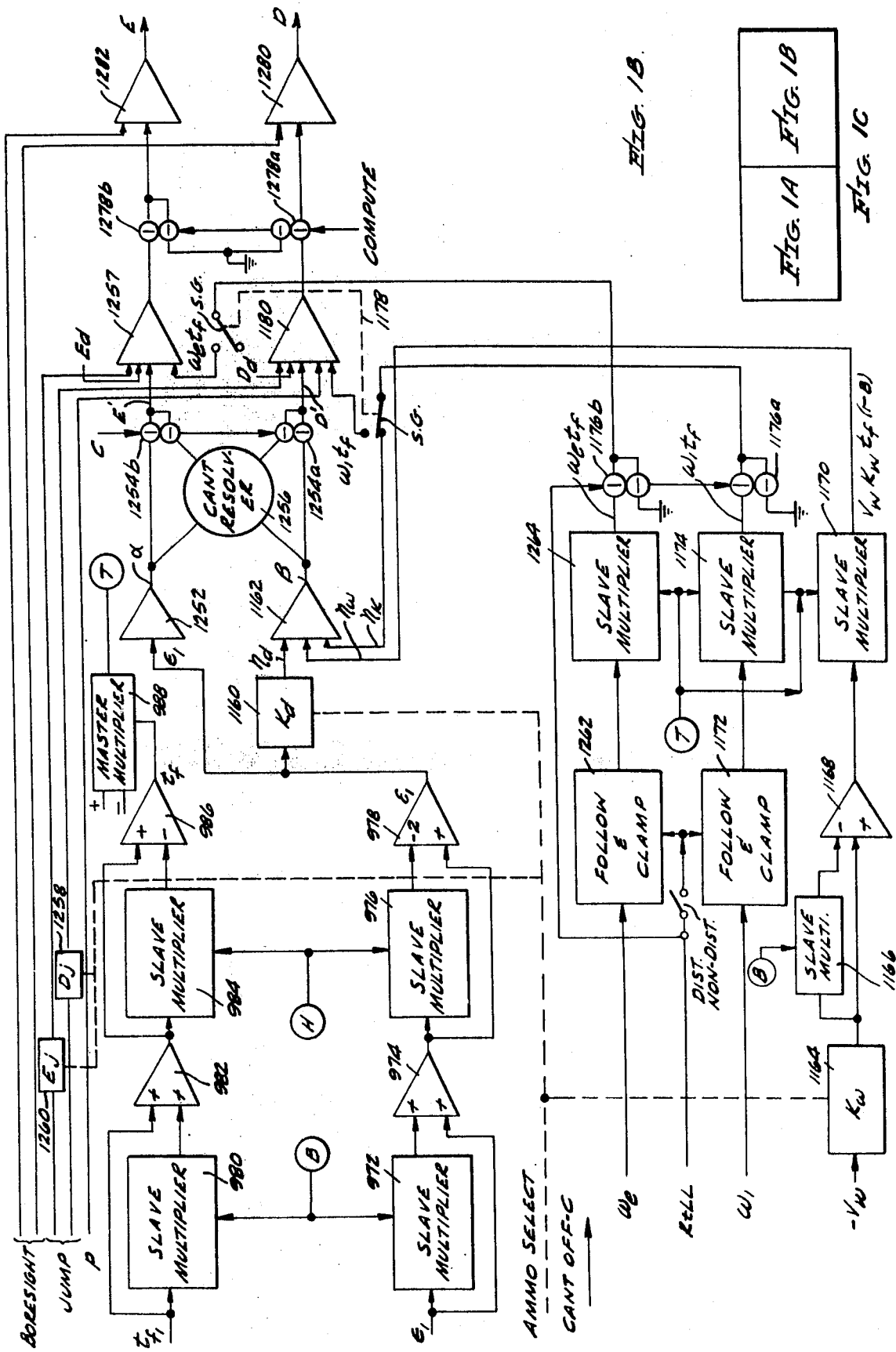

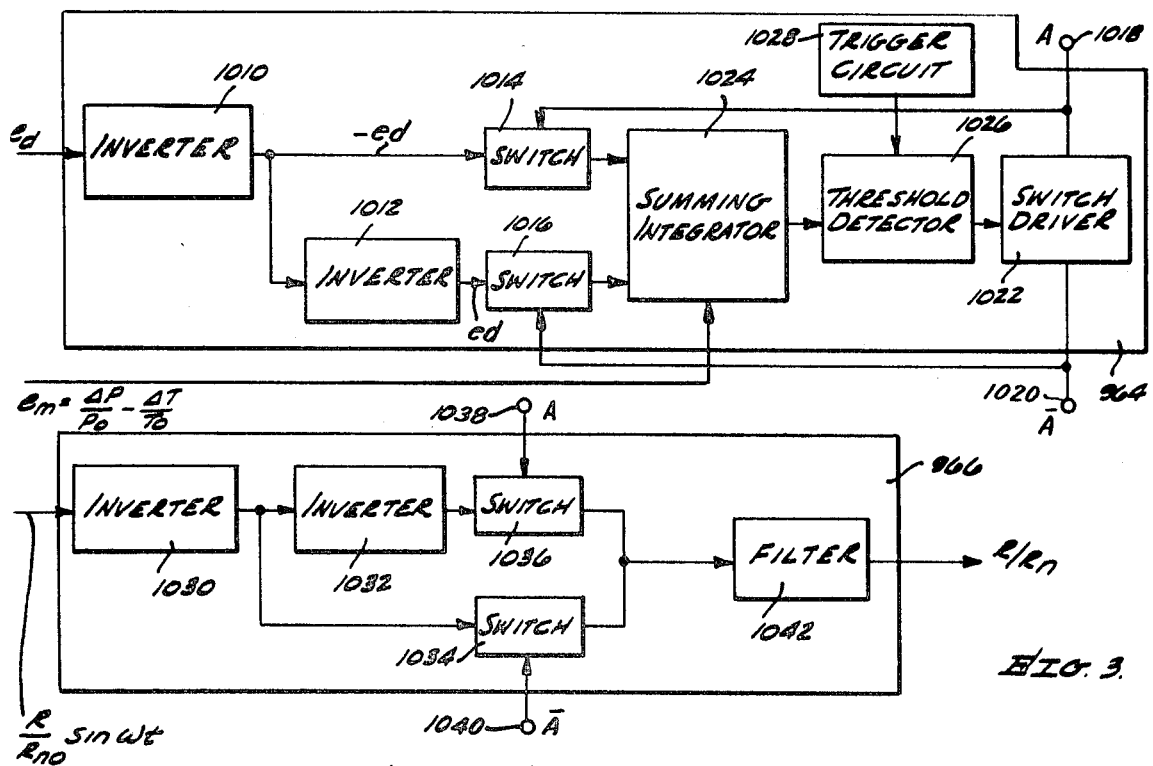
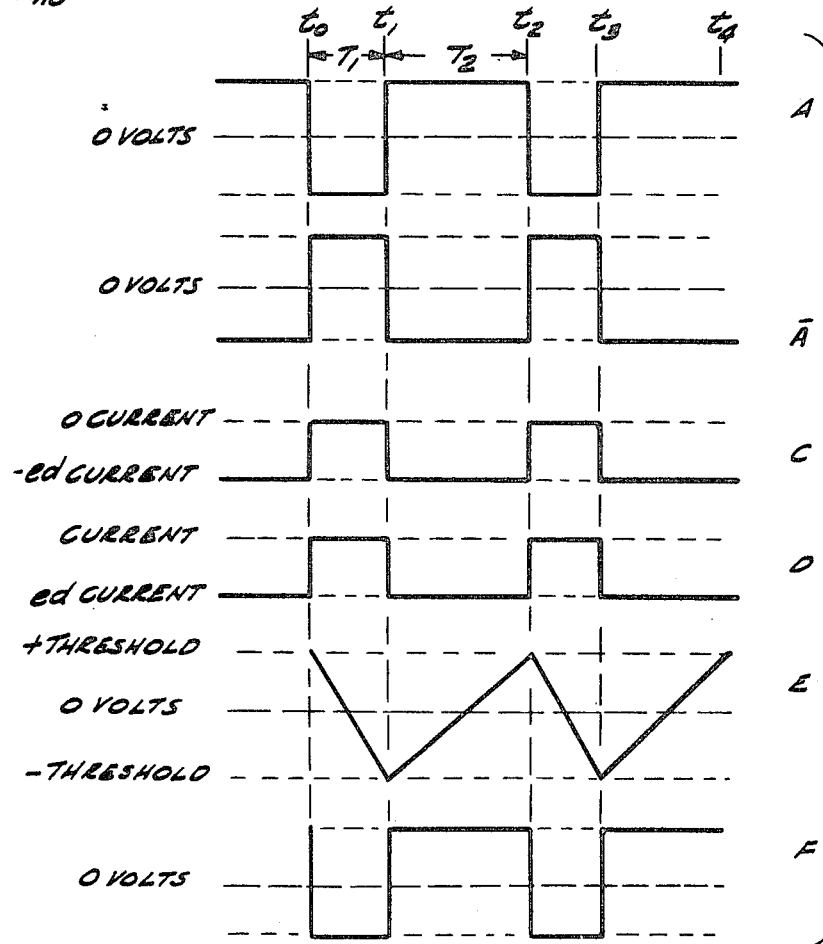
FIG. 3.
FIG. 4.

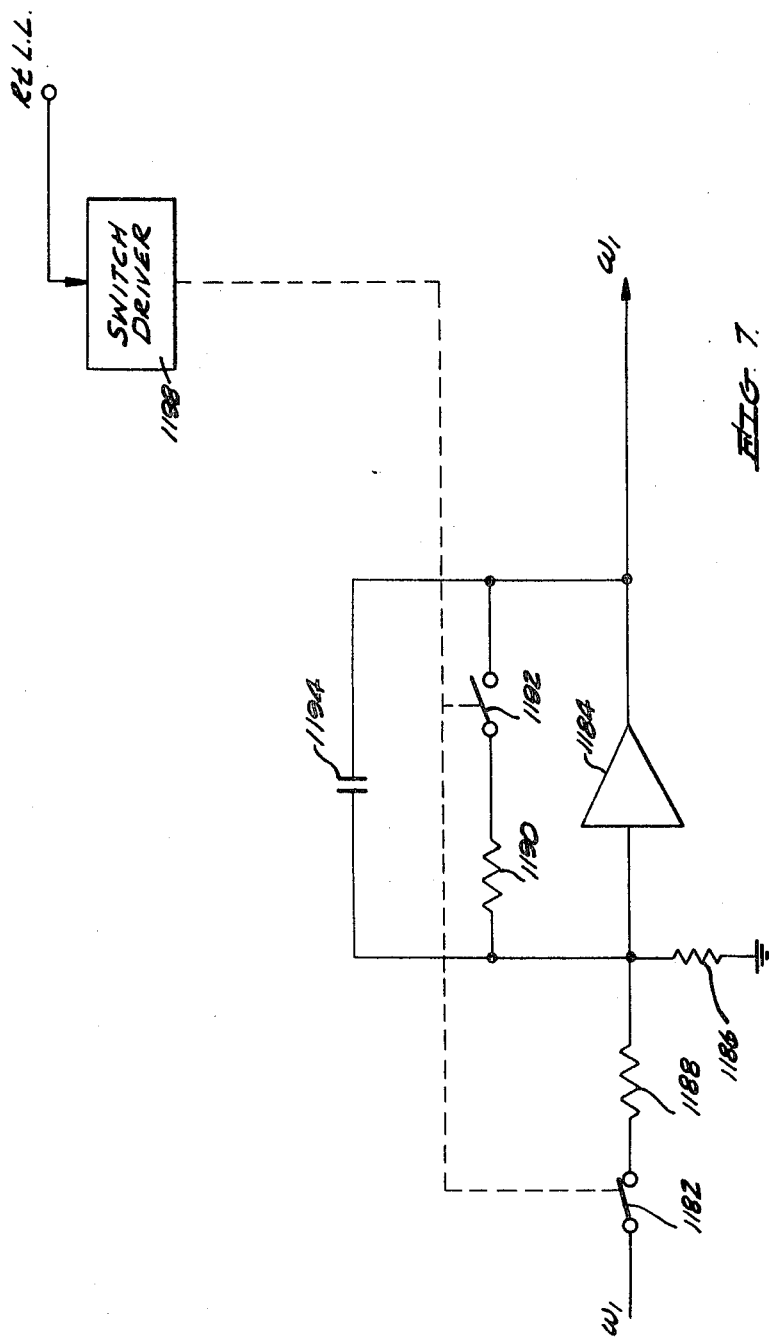

IN-LINE PARTIAL DERIVATIVE MULTIPLIER FOR COMPUTER CIRCUITS

BACKGROUND OF THE INVENTION

This invention relates generally to analog computers, and relates more particularly to a computer for generating signals which are related to functions of an input signal for standard conditions and the partial derivative of any variations in the standard conditions.

In computer circuits such as, for example, ballistic computers, range information has heretofore been fed to a computer circuit which would produce output signals related to the ballistics of a projectile when the physical characteristics such as its velocity, ambient atmospheric condition, gravitational conditions, the shape, the mass, and the spin were known or assumed. Generally, these signals were generated by function generators which were specifically mechanized for each specific projectile. For example, function generators have been mechanized using electromechanical range followup servos to position the armatures of padded range function potentiometers. Since other projectiles could have other ballistics characteristics as a result of different velocities, masses, shapes, and so forth, it became necessary to remechanize the function generator so that the generated output signals were related to the ballistics of the new projectile.

Heretofore the effects of variations in the variables from their standard values have been handled in one of three ways when the variations have been small relative to the absolute values. These ways have been to ignore the variations, to fully mechanize the circuit, disregarding the limited dynamic range of the variables, and to mechanize the circuit with a first order Taylor series approximation. For the general case of several variables such as $F(u, v, w,)$ the mechanization equation for the Taylor series method would be $F(u_o, v_o, w_o)+F'(u, v_o, w_o)(uu_o)+F'(v, u_o, w_o)(v-v_o)+F'(w, u_o v_o)(w-w_o)$. In order to mechanize this equation it would be necessary to mechanize the function $F(u_o, v_o, w_o)$ for standard conditions $u_o, v_o,$ and $w_o$, the partials $F'(u, v_o, w_o), F'(v, u_o, w_o)$ and $F'(w, u_o, v_o)$, multiply each of the partials by the corresponding charge in its variable and sum the four terms together. Thus, it was necessary to implement function generators for each partial and to sum the partials with the function. Also, the implication of the method is that there is no significant effect of a change in one variable on the effect due to a change in another.

SUMMARY OF THE INVENTION

Accordingly, it is an object of this invention to provide improvements in a computer which is operable to generate signals related to the function of input signals for standard conditions and variations in the standard conditions.

Another object of this invention is to provide a ballistic computer circuit which is operable to produce ballistics functions related to the ballistics of a plurality of projectile types for standard conditions and for variations in the standard conditions.

Still another object is to provide improvements in a ballistics computer having the advantages that: a small number of function generators can be utilized for producing functions of an input signal having one or more variables; variations in nonstandard conditions including air density as a result of atmospheric pressure and temperature variation, variations in the drag coefficient as a result of changes in the mach number due to changes in air temperature, changes in muzzle velocity as a result of tube wear and propellant temperature, and changes in crosswind and range wind coefficients as a result of any of the above can be compensated for outside of the function generator, and that lends itself to solid-state implementation, is simplified relative to other known devices, and has a small size.

Other objectives of this invention can be attained by utilization with a computer circuit having one or more parallel channels wherein each channel is operable to receive input information, such as a range signal when the computer is implemented as a ballistics computer. The range information R for several of the channels is fed through an adjustable ballistics term multiplier which normalizes the range information R with a specific range normalizing transfer function or term $R_n$, derived from standard ballistic and environmental conditions for the selected projectile type. Thereafter, the normalized range information $R/R_n$ is fed through a multiplier circuit which operably multiplies the signal by the partial derivative of nonstandard air temperature and pressure. The general case multiplication factor is a first order in line partial approximation $(1+K\Delta u/u)$ of a partial derivative where for a common case if:

$$f(x)=u^k$$

then $$f'(x)=(k/uf(u))$$

and $$k=(uf'(u))(f(u))$$

for the conditions:

$$\Delta u << u$$

when $$k>1$$

More specifically, for a ballistic computer the in-line partial derivative is for changes $\Delta R_n$ in the normalizing term $1/R_n$ as a result of variations in air pressure $\Delta P$ and air temperature $\Delta T$. Consequently, the in-line partial multiplication correction factor becomes $(1\pm(\Delta R_n)/R_n)$. In other words, the function is multiplied by a term related to the ratio of the change in a condition to a standard condition to produce a product and is also summed with this product.

For the more general case the in-line partial technique for multiplier functions $F(u, v, w)$ would be implemented with a single function generator for producing the function $F(u_o, v_o, w_o)$ for predetermined conditions $u_o, v_o,$ and $w_o$ and multiplying this function by the in-line partial multiplication factors $(1+k(\Delta u_o)/u_o), (1+k(\Delta v_o)/v_o),$ and $(1+k(\Delta w_o)/w_o)$. Furthermore, the computer compensates for ballistic drift by multiplying the superelevation signal by a separate ballistic constant for each selected ammunition and compensates for crosswind effects by multiplying the time of flight signal by separate ballistic constants for each selected ammunition.

Other objects, features and advantages of this invention will become apparent upon reading the following detailed description and referring to the accompanying drawings wherein:

FIGS. 1A and 1B, taken together as indicated in FIG. 1C, are block diagrams illustrating the ballistic computer and resolver circuit;

FIG. 3 is a block diagram of a master-slave multiplier of the type used in the computer illustrated in FIGS. 1A and 1B;

FIGS. 4A through 4F are timing diagrams of the waveforms of signals developed in the master-slave multiplier of FIG. 3;

FIG. 7 is a circuit diagram of the follow and clamp circuit used in the computer circuit illustrated in FIG. 1B.

DETAILED DESCRIPTION OF PREFERRED EMBODIMENT

Figure 1A:
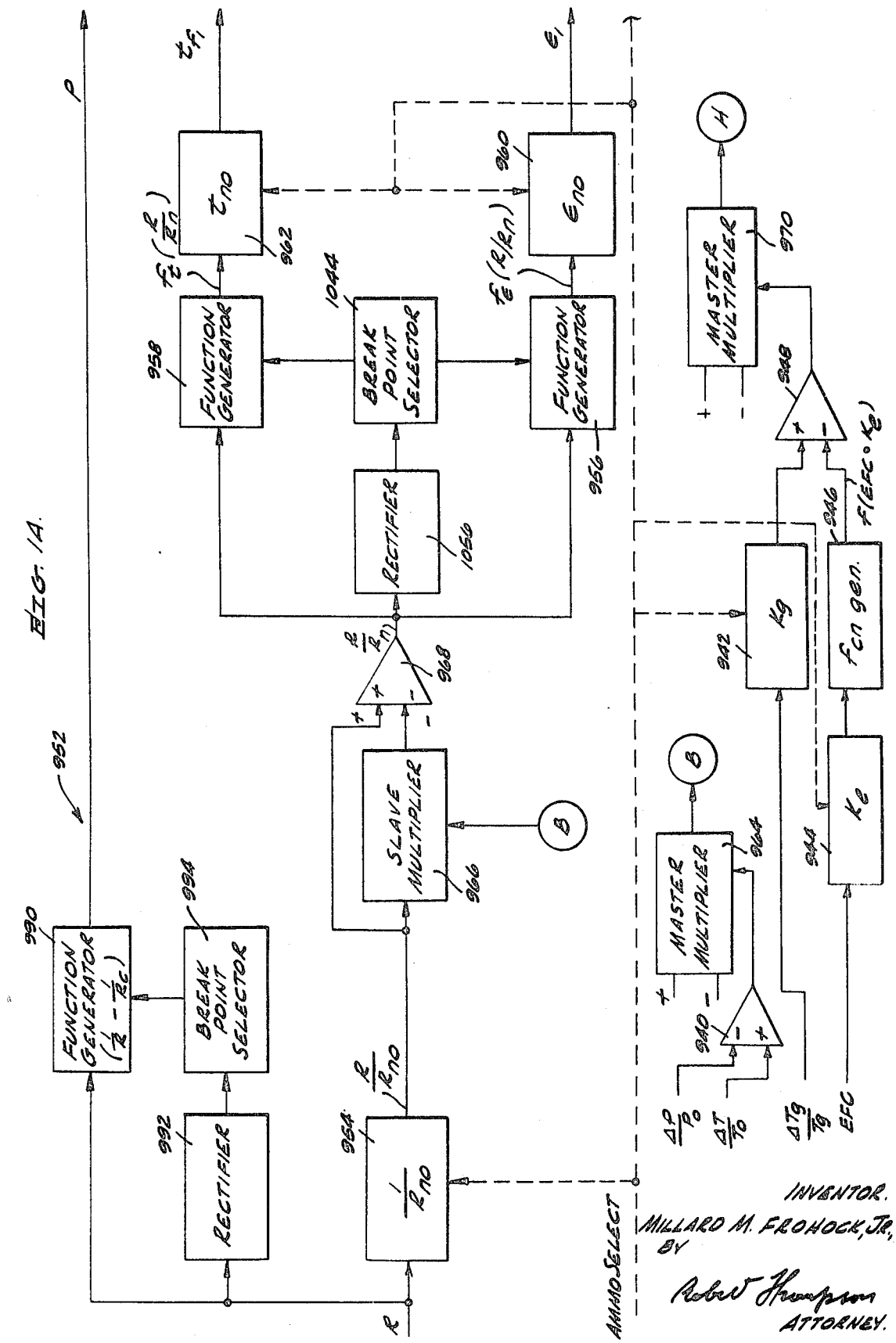

Referring now to an embodiment of the ballistics computer 950 in more detail, reference is made to FIGS. 1A and 1B, wherein range information R and nonstandard condition information are fed into a computer which generates a superelevation signal $\epsilon$, a time of flight signal $t_f$, a ballistic drift signal $\eta_0$, and a crosswind coefficient $\eta_w$, in accordance with ballistic equations. These signals are used for generating fire control signals such as elevation E, and deflection D.

Once the range is known, the ballistic characteristics of the projectile and environmental conditions must be known in order to generate fire control signals in accordance with the ballistic equations. For example, it is desirable to know the effects of ballistic conditions, such as the projectile's mass, initial velocity, and environmental conditions such as shape, size, spin velocity, the air density, air temperature, air pressure, crosswind, propellant temperature, angular turret rate, etc.

Since many of the ballistic characteristics will differ for different projectiles, or ammunitions, the resulting signals such as superelevation $\epsilon$, time of flight $t_f$, ballistic drift $\eta_0$, and crosswind coefficient $K_{cw}$ will also differ for each projectile.

It has been discovered that the nonlinear equations of ballistic flight from which standard condition superelevation $\epsilon_0$, and standard condition time of flight $t_{fo}$ are derived, can be produced for a plurality of projectiles by: a first variable multiplier 954 which multiplies or operates on the range signal R by an individual ballistic term including an individual normalizing transfer function; $1/R_n$ to produce a normalized range signal $R/R_n$ for each individual projectile; function generating circuits 956 and 958 in two parallel channels which operate on the normalized range signal with a single predetermined transfer function common to the ballistics of a plurality of projectile types for generating the nonlinear function signals $f_\epsilon(R/R_n)$ and $f_t(R/R_n)$, respectively, which are related to the selected projectiles; and variable multipliers 960 and 962 for multiplying or operating on the function signals by individual second ballistic terms on unnormalizing transfer functions $\epsilon_{no}$ and $t_{no}$, which are related to the selected individual projectile. It should be stated that the ballistic terms $R_{no}$, $\epsilon_{no}$ and $t_{no}$ can be considered constants or linear for a set of standard conditions.

For example, the approximated equation for standard conditions superelevation $\epsilon_0$ which is the angle by which the projector (such as a gun) is pointed above the line of sight to a target, is:

$$\epsilon_o = \frac{mg}{2KV_o^2} \left( \frac{e^{2RK/m}-1}{2RK/m} - 1 \right) \quad (1)$$

and the approximated equation for standard conditions time of flight $t_{fo}$ of the projectile is:

$$t_{fo} = \frac{m}{KV_o}(e^{RK/m}-1) \quad (2)$$

where
$K_D$ = drag coefficient
$R$ = range
$K = pd^2 K_D$
$p$ = air density
$d$ = projectile diameter
$m$ = projectile mass
$V_o$ = projectile initial velocity
$g$ = gravity Ballistic drift $\eta_o$ for standard conditions is proportional to superelevation $\epsilon_o$ according to the following equation:

$$\eta_o = (-K_d \epsilon_o)/V_o \quad (3a)$$

where $K_d$ is a term, dependent upon projectile inertia, spin velocity, and lift and moment coefficients, which may be determined for each ammunition. The crosswind coefficient $\eta_w$ for standard conditions is found by $$\eta_w = V_w K_w t_f \quad (3b)$$

where $K_w$ is an ammunition dependent coefficient.

As previously stated, it has been determined that signals which are a function of the ballistics equations can be produced by circuits which operate on the range information R in accordance with transfer conditions for ballistic terms and normalized functions.

For example, superelevation $\epsilon_o$ is produced by a circuit which operates on a range signal R in accordance with the following approximate equation:

$$\epsilon_o = \epsilon_{no} \frac{e^{2(R/R_n)}-1}{2(R/R_n)} - 1 = \epsilon_{no} f_\epsilon(R/R_n) \quad (4)$$

where the transfer functions:

$$\epsilon_{no} = \frac{mg}{2KV_o} = \frac{mg}{2pd^2V_o K_D} = \frac{R_n}{2V_o^2} \quad (5)$$

$$R_n = \frac{m}{K} = \frac{m}{pd^2 K_D}$$
$$= \frac{K_n m T a^{3/2}}{d^2 Pa(Ta^{1/2}-K_t)} \quad (6)$$

where:
$Ta$ = air temperature
$Pa$ = air pressure
$Kn$ = projectile ballistic constant
$K_t$ = temperature coefficient a signal related to time of flight $t_{fo}$ is produced by a circuit which operates on a range signal R in accordance with the following approximate equation:

$$t_{fo} = t_{no}(e^{(R/R_{no})}-1) = t_{no} f_t(R/R_n) \quad (7)$$

where the transfer function:
$$t_{no} = m/KV_o = m/(pd^2 V_o K_D) \quad (8)$$

From these equations, it can be seen that, in implementing the circuits, transfer functions $R_n$, $\epsilon_n$, and $t_n$ are ballistic terms which are related to the particular projectile or ammunition's ballistic and environmental condition, and can be treated as linear for any fixed set of standard conditions, while transfer functions $f_\epsilon(R/R_n)$ and $f_t(R/R_n)$ are functions which are independent of the projectile type and condition or, in other words, which are common to all of the projectile types. The advantage of this is that only one such nonlinear function generator per ballistic signal need be mechanized for a plurality of the projectile types and that nonstandard conditions signals can be applied to the computer outside of the function generator, as will be explained subsequently.

Referring to the block diagram of FIG. 1A in more detail, the range signal R is first normalized by multiplying by a standard condition normalizing term or individual transfer function related to a selected individual one of a plurality of ammunition types $1/R_{no}$ using a ballistics constant multiplier circuit 954, which is hereinafter also referred to as ballistic term multiplier, and which is adjustable for each ammunition.

As will be explained in more detail subsequently, the normalizing term $1/R_{no}$ is corrected for changes $1/\Delta R_n$ resulting from variations in air pressure $\Delta P$ and changes in air temperature $\Delta T$ by multiplying the term by an in-line partial multiplication factor $(1-B)$ where:

$$B = (\Delta Rn/R_n$$

Consequently, the equation for superelevation $\epsilon_1$ and time of flight $t_{f1}$ partially corrected for nonstandard conditions become:

$$\epsilon_1 = \epsilon_o (1-B)$$

$$\epsilon_1 = \left(\frac{gR_n}{2V_o^2}\right) \left[ \frac{e^{2(R/R_n)\left(1-\frac{\Delta R_n}{R_n}\right)}-1}{2(R/R)\left(1-\frac{\Delta R_n}{R_n}\right)} - 1 \right]$$

$$t_{f1} = \frac{R_n}{V_o}\left(e^{(R/R_n)\left(1-\frac{\Delta R_n}{R_n}\right)}-1\right)$$

As previously stated, the normalizing term $1/R_n$ is inversely proportional to a function of air temperature T and proportional to air pressure P whereupon the factor B can be produced by the portion of the in-line partial derivative circuit of FIG. 1A which includes as a portion thereof, a summing amplifier 940. The summing amplifier 940 receives the sensed air temperature input signal $(\Delta T)/(To)$ at one input and multiplies it by a temperature constant $K$. The summing amplifier 940 also receives the sensed air pressure input signal $\Delta P/Po$ at a second input terminal. These signals are summed and the output signal $B$ of the amplifier 940 then becomes:

$$B = \frac{\Delta R_n}{R_n}$$
$$= \frac{\Delta P}{P_0} - K\frac{\Delta T}{To}$$

As will be explained in more detail subsequently with reference to FIGS. 1A and 1B, the superelevation signal $\epsilon_1$ and the time of flight signal $t_{f1}$ are fully corrected for nonstandard conditions by further multiplying them by the in-line partial multiplication factors $(1+B)$ and $(1-KH)$ which are respectively dependent upon variations in the normalizing term $1/R_n$ as a result of variations in air temperature $\Delta T$ and air pressure $\Delta P$ and dependent upon variations in initial velocity $\Delta Vo$ as a result of variations in a function of effective full charge EFC and variation in propellant grain temperature $\Delta Tg$.

The partially corrected superelevation signal $\epsilon_1$ is thus further corrected for nonstandard conditions and is identified by the equation:

$$\epsilon = \epsilon_1(1+B)(1-2H)$$
$$= \epsilon_1\left(1+\frac{\Delta R_n}{R_n}\right)\left(1-2\frac{\Delta V_0}{V_0}\right)$$

where
$$B = (\Delta R_n)/R_n \text{ and}$$
$$H = (\Delta V_o)/V_o$$

The partially corrected time of flight signal $t_{f1}$ is further corrected for nonstandard conditions and becomes:

$$t_f = t_{f1}(1+B)(1-H)$$
$$= t_{f1}\left(1+\frac{\Delta R_n}{R_n}\right)\left(1-\frac{\Delta V_0}{V_0}\right)$$

The factor $H$ can be produced by a second in-line partial derivative circuit of FIG. 1A wherein a sensed propellant grain temperature signal $(\Delta Tg/Tg)$ is received by an adjustable ballistic term multiplier 942, multiplied by a separate ballistic term $K_g$ for each selected ammunition, and is then fed to one input of a summing amplifier 948. An effective full charge signal (EFC) is received by an adjustable ballistic term multiplier 944, is multiplied by a separate ballistic term $K_e$ for each selected ammunition, and is fed through a function generator 946. The function generator 946 can be a two or more straight line approximation function generator of a type to be described in more detail subsequent for producing an output signal $f(K^e.\text{EFC})$ which is fed to another input of the summing amplifier 948. The resulting output signal is the factor H where:

$$H = \frac{\Delta Vo}{Vo}$$
$$= f(Ke \cdot EFC) - K\frac{\Delta Tg}{Tg}$$

A nonstandard temperature-pressure coefficient signal $B$, which is to be applied to the standard condition normalized range signal $R/R_{no}$ is fed to and reproduced at the output of a master multiplier 964 which forms part of the first and second in-line partial derivative multiplier in response to air temperature and pressure sensor inputs $(\Delta T)/(T_o)$ and $(\Delta P)/P_o$. The standard condition normalized range signal $R/R_{no}$, when applied to one input of a slave multiplier 966 in the first in-line partial derivative multiplier, is multiplied by the pressure-temperature coefficient $B$ to produce an output signal $(R)/R_{no}\cdot(B)$ which is fed to an inverting input of an operational amplifier 968 which forms part of the first in-line partial derivative multiplier. The master-slave multiplier is of the general type described in U.S. Pat. No. 3,493,737, issued to Roger H. Edelson, on Feb. 3, 1970 and assigned to the same assignee. The signal $R/R_{no}$ is also fed directly to a noninverting input of the operational amplifier 968 to produce an output signal:

$$R/R_{no}(1-B) = R/R_n$$

where
$R/R_{no}$ is the normalized range signal for standard conditions;
and
$R/R_{no}$ is the normalized range signal for nonstandard pressure-temperature conditions;
and $$B = (\Delta P)/(Po) - (K_t\Delta T)/To) \quad 1$$

where
$\Delta P$ is the change in air pressure from a standard condition pressure;
$Po$ is the standard condition air pressure;
$K_t$ is a temperature coefficient;
$\Delta T$ is the change in air temperature from a standard condition air temperature; and
$To$ is the standard condition air temperature.

The normalized range signal $R/R_n$ is then fed to function generators 956 and 958 which are connected in parallel circuit relationship to produce nonlinear ballistic function output signals $f_\epsilon(R/R_n)$ and $f_t(R/R_n)$, respectively in accordance with their single predetermined transfer functions. These nonlinear function output signals are then fed to ballistic constant multipliers 960 and 962 respectively, which are hereinafter also referred to as ballistic term multiplier, and which multiply them by the unnormalizing standard condition ballistic terms or transfer functions $\epsilon_{no}$ and $t_{no}$, respectively for the selected projectile type. Consequently, the output signal $\epsilon_{no}f_\epsilon(R/R_n)$ of the ballistic constant multiplier 960 is related to the superelevation $\epsilon_1$ for the particular projectile at the particular range $R$ in accordance with the preceding ballistic equation (equation 4) which is partially corrected for nonstandard temperature-pressure conditions. The output signal $t_{no}f_t(R/R_n)$ of the ballistic constant multiplier 962 is related to the time of flight $t_{f1}$ of the selected projectile at the particular range $R$ in accordance with the preceding equation for time of flight $t_{fo}$ (equation 7), which is partially corrected for nonstandard temperature-pressure conditions.

Referring now to FIG. 1A, a master multiplier 970 which forms part of the third in-line partial derivative multiplier receives grain temperature and effective full charge sensor input signals $$\frac{\Delta T_g K_g}{T_g} - f(EFC \cdot Ke)$$

for producing the muzzle velocity coefficient $H$ which, along with the temperature-pressure coefficient $B$ is applied in series circuit with the function generators to correct the partially corrected superelevation $\epsilon_1$ and time of flight $t_{f1}$ signals by means of the circuit illustrated in FIG. 1B. The partially corrected superelevation signal $\epsilon_1$ is fed through a first slave multiplier 972 which forms part of an in-line partial derivative multiplier circuit and is multiplied by the temperature-pressure coefficient $B$ to produce an output signal $\epsilon_1(B)$ which is fed to an input of an operational amplifier 974 which also forms part of this in-line partial derivative multiplier circuit. The partially corrected superelevation signal $\epsilon_1$ is also fed directly to another input of the operational amplifier 974 which also forms part of this in-line partial derivative multiplier circuit, whereupon the output signal thereof on the channel becomes $\epsilon_1(1+B)$. This output signal is then fed through a second slave multiplier 976 which also forms part of this in-line partial derivative multiplier circuit wherein it is multiplied by the muzzle velocity coefficient $H$ to produce a signal $\epsilon_1(1+B)H$ which is fed to an input terminal of the operational amplifier 978 in this same in-line partial derivative multiplier circuit to invert and amplify the input signal by a factor $-2$. The signal $\epsilon_1(1+B)$ is also fed directly to another input of the operational amplifier 978, whereupon the operational amplifier produces a superelevation output signal $\epsilon$ on the channel which is corrected for nonstandard conditions where:

$$\epsilon = \epsilon_1(1+B)(1-2H)$$

$$H = \frac{\Delta V_0}{V_0}$$

$$= f(EFC)_A + \frac{\Delta T_g}{T_g} \cdot K_{gA}$$

where $f(EFC)_A$ is an empirically derived function of effective full charge for a selected ammunition $A$;

$\Delta T_g$ = change in propellant grain temperatures from standard value;

$T_g$ = standard condition propellant grain temperature;

$K_{gA}$ = a temperature coefficient for a selected ammunition.

The partially corrected time of flight signal $t_{f1}$ is fed through a first slave multiplier 980 which forms part of a separate in-line partial derivative multiplier wherein it is multiplied by the temperature-pressure coefficient $B$ received from the master multiplier 964 to produce an output signal $t_{f1}B$ which is fed to one input of an operational amplifier 982 which also forms part of the in-line partial derivative multiplier circuit. The partially corrected time of flight signal $t_{f1}$ is also fed directly to another input of the operational amplifier 982 wherein the further corrected time of flight output signal $t_{f1}(1+B)$ is produced on the channel. This further corrected time of flight signal is fed through a second slave multiplier 984 which forms part of still another in-line partial derivative multiplier circuit wherein it is multiplied by the muzzle velocity coefficient $H$ to produce a signal $t_{f1}\cdot(1+B)H$ which is fed to an inverting input of an operational amplifier 986 of this same in-line partial derivative multiplier circuit. The further corrected time of flight signal $t_{f1}(1+B)$ is also fed directly to another input of the operational amplifier 986 which produces a nonstandard condition time of flight output signal $t_f$ on the channel where:

$$t_f = t_{f1}(1+B)(1-H)$$

This time of flight signal $t_f$ is fed to a master multiplier 988 for use as a time of flight multiplier signal $T$, as will be explained in more detail shortly.

The computer 950 also generates a parallax correction signal $p$ to compensate for the offset distance at the turret between the line of sight and the gun line. The range signal $R$ is fed to a function generator 990 and a rectifier 992. As will be explained in more detail subsequently, the output of the rectifier is fed to a breakpoint selector 994 which determines the gain slope and offset of the function generator 990 for producing a parallax correction output signal $p$ at the range $R$ where:

$$p = (D_p/R) - (D_p/R_c)$$
$$= D_p(1/R - 1/R_c)$$

$D_p$ is the offset distance between the line of sight and the gun line;

$R$ is the measured range;

$R_c$ is a crossover range where line of sight crosses the gun line.

For parallax elevation corrections:

$$p_e = (D_{pe}/R) - (D_{pe}/R_c)$$
$$= D_{pe}(1/R - 1/R_c)$$

where;

$D_{pe}$ is a constant for each tank.

For parallax deflection correction:

$$p_d = (D_{pd}/R) - (D_{pd}/R_c)$$
$$= D_{pd}(1/R - 1/R_c)$$

where:

$D_{pd}$ is a constant for each tank.

Figure 2:
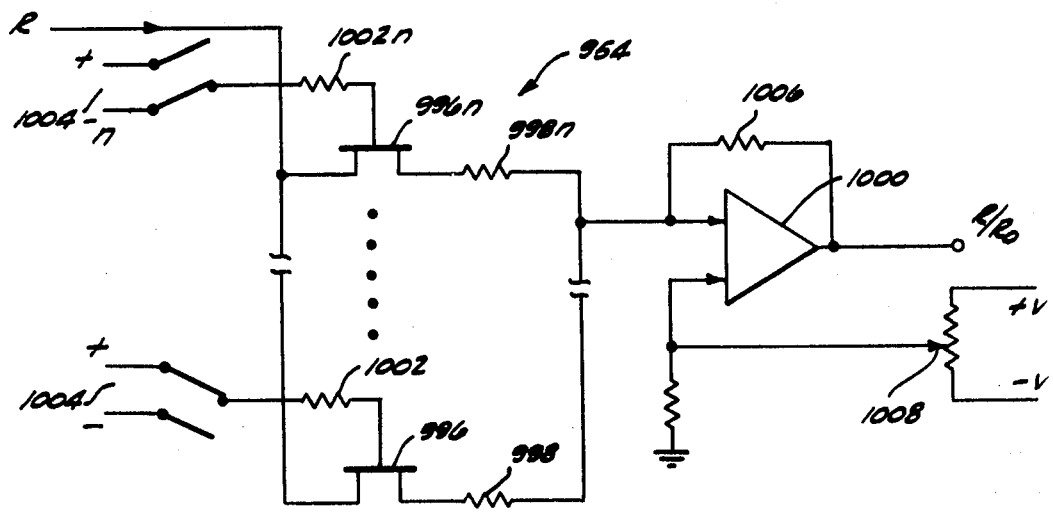
FIG. 2 is a schematic diagram of an adjustable ballistic term multiplier of the type used in the computer illustrated in FIGS. 1A and 1B.

Referring now to the ballistic computer in more detail, the range signal $R$ is fed to the ballistic term multiplier 954, illustrated in FIG. 2 for producing a normalized range signal $R/R_{no}$ in accordance with the normalizing transfer function $1/R_{no}$ for each selected one of a plurality of projectiles. More specifically, the ballistic term multiplier 954 is an operational amplifier having a plurality of $n$ parallel selectable gain set input resistance circuit branches which each include one of a plurality of junction FET transistors 996 through 996$n$ connected in series with one of a plurality of resistors 998 through 998$n$ respectively, the resistance circuit branches being connected to one input of an amplifier 1000. The subscript $n$ represents the circuit elements in the $n$th resistance circuit and is equal to a corresponding number of projectiles. In operation, only one of the junction FET transistors 996 through 996$n$ is turned on by a positive voltage signal $+V$ applied to its gate terminal through a resistor of resistors 1002 through 1002$n$, respectively, while all other ones of the FET'S 996 through 996$n$ are turned off by a negative voltage $-V$ applied to the gate terminals thereof through the other ones of respective resistors 1002 through 1002$n$.

Assume, then, that the projectile or ammunition selected has a linear ballistic term or normalizing transfer function $1/R_{no}$, which is set into the ballistic term multiplier 954 as a normalizing transfer function by the sum of the series resistances in the circuit branch between the source terminal and drain terminal of FET transistor 996 when it is turned on, and the resistor 998 connected between the FET transistor 996 and one input of the operational amplifier 1000. In operation, an ammunition selection switch 1004 through 1004$n$ is positioned so that a $+V$ voltage is applied through the resistor 1002 to the gate terminal of FET transistor 996 to turn it on while all other FET transistors will have a $-V$ voltage applied to their gate terminals by the switch, such as 996$n$, and are turned off. The operational amplifier 1000 can be a $\mu$A709 High Performance Operational Amplifier, manufactured by Fairchild Semiconductor Corporation and described and illustrated in their handbook, Fairchild Semiconductor Linear Integrated Circuits Applications Handbook, 1967.

The operational amplifier 1000 is compensated for a gain of unity and a feedback resistor 1006 is connected between the output terminal of the operational amplifier 1000 and one input terminal thereof so that the gain of the ballistic term multiplier 954 is proportional to the ratio of the resistance of feedback resistor 1006 and the sum of the resistances between the source terminal and drain terminal of the turned-on FET transistor 996 and resistor 998 and can be expressed by the term $1/R_{no}$. The received range signal $R$ is multiplied by the ballistic term transfer function $1/R_{no}$, whereupon the output signal of the ballistic term multiplier 954 is a normalized range signal $R/R_{no}$ for standard conditions for the selected ammunition.

Any gain resulting from the resistance circuits associated with turned-off FET transistors can be disregarded since the resistance between the source and the drain terminal is very high relative to other circuit resistances. The zero offset of operational amplifier 1000 can be set by a center pickoff on a potentiometer 1008 wherein the pickoff voltage is substantially zero volts and is applied to one input terminal of the operational amplifier 1000 through a resistor network.

For other projectiles, the ballistic term or transfer function $1/R_{no}$ will be different since the resistance of resistors 998 through 998$n$ is selected to fit the different ballistic terms for different projectiles. Thus, the selected normalized range output signal $R/R_{no}$ is specifically related to the selected projectile. The output signal $R/R_{no}$ is then fed to the ballistic function generator 956 and the ballistic function generator 958.

Before being fed to the function generators the normalized range signal $R/R_{no}$ on the main channel is corrected in series circuit for nonstandard air temperature and air pressure conditions by an in-line partial derivative multiplier including a master-slave time division multiplier 964–966. The time division multiplier can be an electronic multiplier of the type described in U.S. Pat. No. 3,493,737, issued to Roger H. Edelson on Feb. 3, 1970 and assigned to the same assignee. Additional description of the operation of this type of multiplier is contained in the book "Electronic Analog and Hybrid Computers," (McGraw-Hill 1964) pp. 268–281, especially FIGS. 7–15 on pg. 273. In this type of multiplier the output is the average of a train of pulses in which the duty cycle is the ratio of two variables and the amplitude is controlled by another variable. For purposes of convenience so that repeated reference to these publications is not necessary such a master-slave time division multiplier is illustrated in FIG. 3 and described briefly herein as including the master portion 964 and the slave portion 966. Even though only one slave 966 is illustrated in FIG. 3, one master can be used to drive a plurality of slave circuits as is illustrated in FIG. 1A.

The master multiplier 964 illustrated in FIG. 3 is coupled to receive DC input reference signal $e_d$ and $e = (\Delta P/P_o) - K(\Delta T/T_o)$ for providing two rectangular wave output signals B and $\bar{B}$ that are equal in magnitude and phase but opposite in polarity. The master multiplier 964 includes a first master inverter 1010 that is coupled to receive the DC input signal $e_d$ and performs an inversion operation thereon, and provides a signal $-e_d$ which is the inverse of the received signal. A second master inverter 1012 receives the inverted DC input signal $-e_d$, performs an inversion operation thereon and provides an output signal $e_d$. Accordingly, the first master inverter 1010 and the second master inverter 1012 fed the opposite polarity output signals $e_d$ and $-e_d$, respectively, to a first master switch 1014 and a second master switch 1016.

The first master inverter 1010 also operates to adjust the gain of the $-e_d$ signal applied to the first master switch 1014 and applied through the second master inverter 1012 to the second master switch 1016. If a system gain of one is desired, the first master inverter 1010 can be set to provide signals to the master switches 1014 and 1016 that have a unity gain in relation to the amplitude of the DC output signal $e_d$. The second master inverter 1012 always operates with a gain of one. With a unity system gain, the $e_d$ input must be larger than the DC input $(\Delta P/P_o) - (\Delta T/T_o)$ for proper circuit operation.

The first master switch 1014 and the second master switch 1016 are further coupled to receive the opposite polarity gating signals A and $\bar{A}$ from the output terminals 1018 and 1020 of a switch driver 1022 to allow alternating sequential operation of the respective switches.

A summing integrator 1024 is coupled to receive the output of the first master switch 1014 and the second master switch 1016 and to receive the $(\Delta P/P_o) - K(\Delta T/T_o)$ input signal for summing or integrating the currents produced by the $(\Delta P/P_o) - K\Delta T/T_o)$ signal and the $-e_d$ and $e_d$ signals. A threshold detector 1026 is coupled to receive the output of the summing integrator 1024 and changes threshold levels between a (+) and a relatively (−) threshold level in response to the trigger output of a trigger circuit 1028. When a threshold level is exceeded by the output signal received from the summing integrator 1024 the switch driver 1022 generates an output pulse which is fed to switch the polarity of its opposite polarity gating signals A and $\bar{A}$ at the terminals 1018 and 1020 at the constant repetition rate of trigger circuit 1028. The output of the trigger circuit 1028 is applied to the threshold detector 1026 to cause the threshold detector to change output states upon receiving trigger signals from the trigger circuit 1028, thereby maintaining the repetition rate of the master portion gating signal output equal to the period of the trigger circuit 1028 with an asymmetrical duty cycle pulse as will be explained in more detail with reference to FIG. 4. The gating signal outputs A and $\bar{A}$ at terminals 1018 and 1020 are in duty cycle form (ratio of on-time to the sum of on-time and off-time) and are alternately sequentially switched from $$+\left(\frac{\frac{\Delta P}{P_0}-K\frac{\Delta T}{T_0}}{e_d}\right) \text{ to } -\left(\frac{\frac{\Delta P}{P_0}-K\frac{\Delta T}{T_0}}{e_d}\right) \text{ and back again}$$

The slave multiplier 966 includes a first slave inverter 1030, a second slave inverter 1032, a first slave switch 1034 and a second slave switch 1036 that operates as described previously for the master inverters 1010 and 1012 and the master switches 1014 and 1016, respectively, of the master portion 964. However, the input to inverter 1030 is an AC signal $R/R_{no} \sin(\omega t)$, having a period that is long with respect to the period of the output A and $\bar{A}$ of the master multiplier. First slave switch 1034 and second slave switch 1036 are coupled to terminals 1018 and 1020 of the master portion 964 via gate terminals 1038 and 1040, respectively, of the slave multiplier 966 to alternately sequentially cause the first slave switch 1034 and the second slave switch 1036 to change state in accordance with threshold level changes being detected by the threshold detector 1026. The outputs of the first slave switch 1034 and the second slave switch 1036 are coupled together and applied to a low-pass averaging or ripple filter 1042 to produce a filtered output signal product that can be represented by the following relationship:

$$(R/R_n \sin(\omega t))\left(\frac{\Delta P}{P_0} - K\frac{\Delta T}{T_0}\right)$$

The master portion 964 divides the quantity $$\left(\frac{\Delta P}{P_0} - K\frac{\Delta T}{T_0}\right)$$

by the quantity $e_d$ to provide a quotient equal to $$\text{to } \left(\frac{\Delta P}{P_0} - K\frac{\Delta T}{T_0}\right)/e_d$$

while the slave portion 966 multiplies that quotient by the quantity $R/R_n \sin(\omega t)$ to produce a product illustrated above.

The the operation of the master-slave time division multiplier of FIG. 3 can best be understood with reference to FIG. 4, wherein: the waveforms illustrate the gating voltage outputs A and $\bar{A}$ of the switch driver 1022 at the terminals 1018 and 1020, respectively; waveforms C and D illustrate the output current waveforms of the first master switch 1014 and the second master switch 1016, respectively; waveform E illustrates the output voltage waveform of the summing integrator 1024; waveform F illustrates the output voltage waveform of the threshold detector 1026. All of the waveforms of FIG. 4 are correlated to the specific times of $t_0, t_1, t_2, t_3$ and $t_4$ with the period $T_1$ equal to $t_1 - t_0$ and the period $T_2$ equal to $t_2 - t_1$.

At time $t_0$ the gating signal B at terminal 1018 goes negative and gates the first master switch 1014 to the "off" or nonconducting state, and the gating signal $\bar{A}$ at terminal 1020 goes positive and gates the second master switch 1016 to the "on" or conducting state. For the $T_1$ period the first switch 1014 remains "off" and the second switch 1016 remains "on." During the $T_1$ period the summing integrator 1024 is caused to be sum of the $e_d$ current D provided by the second master switch 1016, and by the $$\left(\frac{\Delta P}{P_o} - K\frac{\Delta T}{T_o}\right)$$

current (not shown), and produces the negative-going ramp voltage E. Because master switch 1014 is nonconducting, there is no $-e_d$ charging current from the first master switch 1014 applied to the summing integrator 1024 during the $T_1$ period. When the negative-going ramp voltage output of the summing integrator 1024 of FIG. 3 reaches a negative (−) threshold level of the threshold detector 1026 fed to switch driver 1028 at time $t_1$, the output signal F of the threshold detector 1026 changes from a negative output value to a positive output value. When the output of the threshold detector 1026 fed to switch driver 1022 goes from a negative value to a positive value the output of the switch driver 1022 changes the polarity of its gating signals A and $\bar{A}$ at terminals 1018 and 1020.

Therefore, at time $t_1$, the gating signal A at terminal 1018 goes positive and the first switch 1014 changes from the "off" or nonconductive state to the "on" or conducting state, and the gating signal $\bar{A}$ at terminal 1020 goes negative and causes the second master switch 1016 to change from the "on" or conducting state to the "off" or nonconducting state. During the $T_2$ period, between times $t_1$ and $t_2$ the first master switch 1014 remains "on" and the second master switch 1016 remains "off". Furthermore, during the $T_2$ period the summing integrator 1024 is charged from the negative (−) threshold level toward the positive (+) threshold level by the sum of the $-e_d$ current C from the first master switch 1014 (FIG. 3) and by the $$\left(\frac{\Delta P}{P_o} - K\frac{\Delta T}{T_o}\right)$$

current, and produces the positive-going ramp voltage E. Because master switch 1016 is "off" there is no $e_d$ charging current output from the second switch 1016 during the $T_2$ period. When the positive-going ramp voltage E applied to switch driver 1022 reaches the positive (+) threshold level at the threshold detector 1026 at time $t_2$, as controlled by the output of trigger circuit 1028 the output F of the threshold detector 1026 changes from a positive output value to a negative output value. When the output F of the threshold detector 1026 goes from a positive value to a negative value, the output of the switch driver 1022 changes the polarity of its gating signals A and $\bar{A}$ at terminals 1018 and 1020. From time $t_2$ on in time the operation of the circuit of FIG. 3 repeats, since the time interval $t_3-t_2$ is identical with $T_1$ and the time interval $t_4-t_3$ is identical with $T_2$.

Upon further analysis of the waveforms of FIG. 4, the master portion 964, or time division portion of the time division multiplier of FIG. 3, carries its division information ($e_m/e_d$) in the form of a duty cycle. The duty cycle is the ratio of the total "on" time ($T_2-T_1$) to total time ($T_1+T_2$). It should be recalled that there are three charging currents being applied to the summing integrator 1024 during this "total cycle time" ($T_1+T_2$). The $$\left(\frac{\Delta P}{P_o} - K\frac{\Delta T}{T_o}\right)$$

current is applied during the ($T_1+T_2$) periods, while the $e_d$ current D from the switch 1016 is only applied during the $T_1$ period and the $-e_d$ current C from the switch 1014 is only applied during the $T_2$ period. The average value of the charging currents applied to the summing integrator 1024 is therefore given by the equation:

$$\frac{\left(\frac{\Delta P}{P_o} - K\frac{\Delta T}{T_o}\right)}{R_1}(T_2+T_1) + \frac{e_d}{R_2}(T_1) + \frac{(-e_d)(T_2)}{R_3} = 0$$

with $R_1$, $R_2$, and $R_3$ being various circuit resistances (not shown) which help control the system gain. For example, the summing integrator 1024 may contain an operational amplifier (not shown) in which $R_1$, $R_2$ and $R_3$ are the input resistances, each being responsive to its respective one of the input signals $$\left(\frac{\Delta P}{P_o} - K\frac{\Delta T}{T_o}\right),$$

$e_d$ and $-e_d$ and connected to a common summing point. When the master portion 964 and its components are designed for a system gain of one, $R_1=R_2=R_3$ and the equation then becomes $$\left(\frac{\Delta P}{P_o} - K\frac{\Delta T}{T_o}\right)(T_2+T_1) + e_d(T_1) + (-e_d)(T_2) = 0$$

Dividing all the terms of the equation by $e_d(T_2+T_1)$ combining like terms, and transposing terms, the resulting expression then becomes:

$$\left(\frac{\frac{\Delta P}{P_o} - K\frac{\Delta T}{T_o}}{e_d}\right) = \frac{T_2-T_1}{T_2+T_1}$$

It has therefore been shown that the quotient $$\left(\frac{\frac{\Delta P}{P_o} - K\frac{\Delta T}{T_o}}{e_d}\right)$$

is obtained by pulse width modulation and is contained in the duty cycle form of $$(T_2-T_1)/(T_2+T_1)$$

The multiplication by the time division multiplier is accomplished by the slave portion 966 by selectively applying the gating pulses A and $\bar{A}$ at the derived duty cycle and the negation thereof to the first slave switch 1034 and the second slave switch 1036 via the terminals 1038 and 1040, while applying the $-R/R_o \sin(\omega t)$ signal from inverter 1030 to switch 1034 and the $(R/R_{no}) \sin(\omega t)$ signal from inverter 1032 to switch 1036.

Since the switch 1036 is "on" or in the conducting state during $T_2$ of the total time ($T_1+T_2$) and "off" or in the nonconducting state during $T_1$ as controlled by waveform A, $(R/R_{no}) \sin(\omega t)$ current only flows through the switch 1036 to the averaging filter 1042 during the $T_2$ period. Averaging filter 1042 can be fabricated in accordance with the principles described in "Electronic Analog and Hybrid Computers," pp. 277-281. Also, since the switch 1034 is "on" or in the conducting state during the $T_1$ of the total time ($T_1+T_2$) and "off" or in the nonconducting state during $T_2$ as controlled by waveform $\bar{A}$, $(R/R_{no}) \sin(\omega t)$ current only flows through the switch 1034 to the averaging filter 1042 during the $T_1$ period. If the slave portion 966 is operated having a gain of one and the output signal of averaging filter 1042 is represented by $(R/R_{no}) \sin(\omega t) B$, then the flow of $(R/R_{no}) \sin(\omega t)$ and $(-R/R_{nob}) \sin(\omega t)$ currents can be represented by the equation $$e_o = \left[(R/R)_{no}) \sin(\omega t)\frac{T_1}{T_2+T_1} + (-R/R_{no}) \sin(\omega t)\frac{T_1}{T_2+T_1}\right].$$

Factoring out the quantity $R/R_{no} \sin(\omega t)$ from the right-hand terms and combining terms, the equation becomes $$R/R_{no} \sin(\omega t) B = R/R_{no} \sin(\omega t)\left[\frac{(T_2-T_1)}{(T_2+T_1)}\right]$$

with the substitution of $(T_2-T_1)/(T_2+T_1)$ by its equality of $$\frac{\frac{\Delta P}{P_o} - K\frac{\Delta T}{T_o}}{e_d}$$

the resulting equation becomes $$(R/R_{no}) \sin(\omega t) B\frac{e_a \cdot e_m}{e_d} = R/R_{no} \sin(\omega t)\frac{\left(\frac{\Delta P}{P_o} - K\frac{\Delta T}{T_o}\right)}{e_d}$$

It is noted that in the above equations the value of represents the value of the AC normalized range signal $(R/R_{no}) \sin(\omega t)$ for the duration of a particular duty cycle; and as noted above the duration of the duty cycle is much shorter than the AC period of the signal $(R/R_{no})\sin(\omega t)$, and hence the change in magnitude of $R/R_{no}\sin(\omega t)$ during any duty cycle is relatively small. This output signal $(R/R_{no}) \sin(\omega t) B$ is fed to the operational amplifier 968 of FIG. 1A. The partially (normalized range signal $(R/R_n) = (R/R_{no}) \sin(\omega t) (1-B)$ previously derived is the output of operational amplifier 968 and is fed to the function generators 956 and 958.

Figure 5:
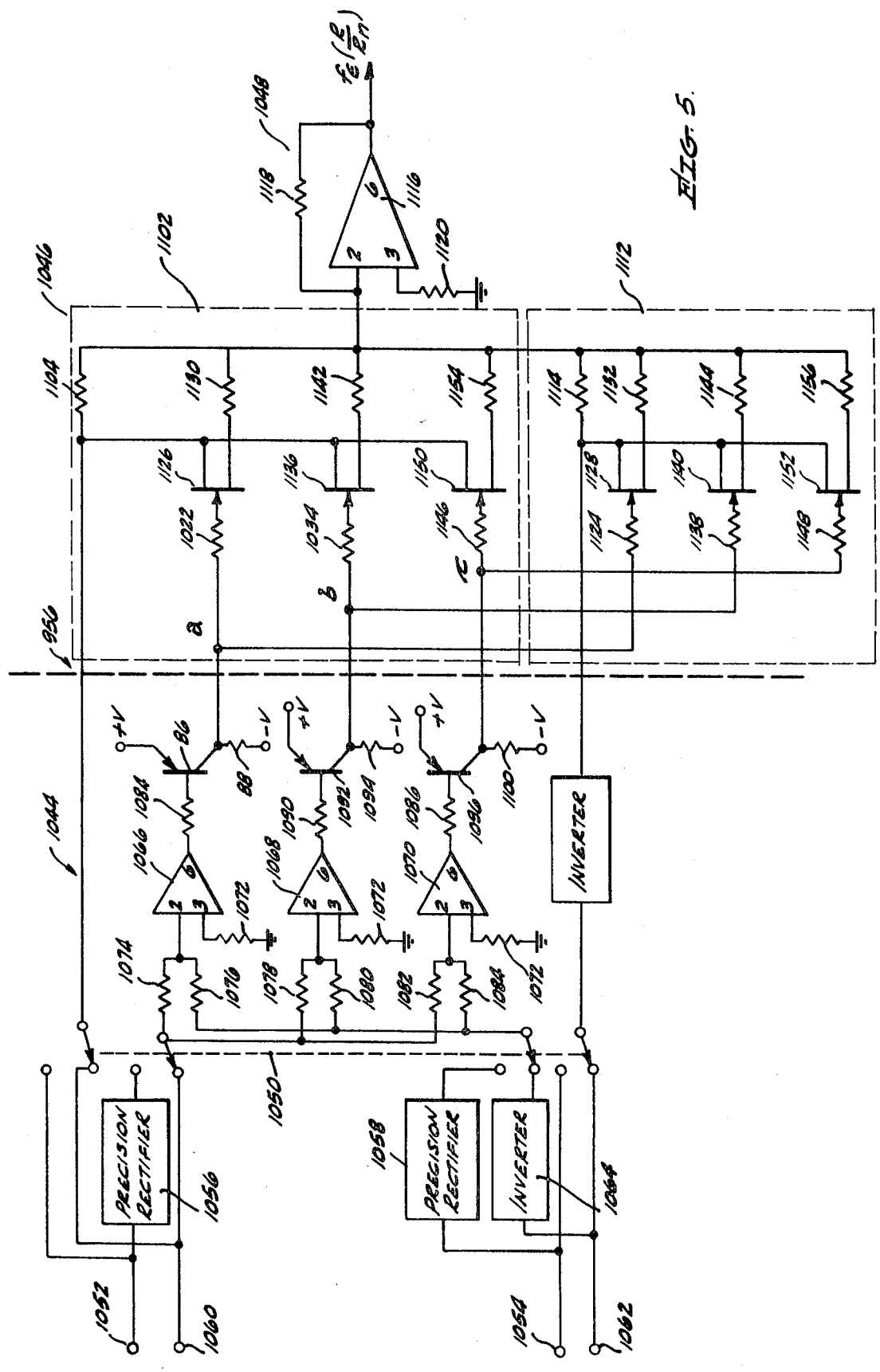
FIG. 5 is a schematic diagram of a function generator circuit of the type used in the computer circuit illustrated in FIG. 1A and includes a rectifier, a breakpoint selector, and a straight line approximation function generator.

FIG. 5 illustrates a function generator 956 for producing an output function $f_e(R/Rn)$ via a plurality of line slope segments. The circuit includes a breakpoint selector 1044 and a switched resistor network 1046, including a plurality of resistance branches which are selectively summed in response to output signals received from the breakpoint selector 1044 wherein the selectively summed resistances are coupled to the input of an operational amplifier 1048 to vary its gain approximately in accordance with a single nonlinear exponential transfer function, which is common to a plurality of ammunition types such as the $f_e(R/Rn)$ function shown in FIG. 6.

The circuitry of FIG. 5 can be used with either a DC or an AC input analog voltage such as the normalized range signal $(R/Rn)$. With an AC input signal a four-pole, two-position switch 1050 is placed in the "AC" position (reverse of that shown), so that both the range input signal and the AC reference voltage being applied to input terminals 1052 and 1054, respectively, can be converted into output DC voltages which are respectively proportional to the RMS value of the respective AC voltages, by the use of precision rectifiers 1056 and 1058. Precision rectifier 1056 produces a +DC output voltage proportional to normalized range $(R/Rn)$, while precision rectifier 1058 produces a −DC output voltage proportional to the AC reference signal input. Normalized range signal ($R/Rn$) and the AC reference voltages are directly applied to the switched resistor network 1046 since they can be utilized therein without being converted into DC voltages first.

With a DC input analog voltage and a DC constant reference voltage, switch 1050 is placed in the "DC" position, as shown in FIG. 5. The DC normalized range signal ($R/Rn$) is then directly applied to both the breakpoint selector 1044 and the switched resistor network 1046 via input terminal 1060. The DC constant reference voltage is applied via input terminal 1062 directly to the switched resistor network 1046, and also applied through inverter 1064 to the breakpoint selector 1044, since a negative (−) DC reference voltage is required for proper operation of the breakpoint selector 1044.

The circuitry of FIG. 5 will hereinafter be described for use with a DC normalized range signal ($R/Rn$) and a DC reference voltage. In the light of the foregoing and subsequent explanation it should be apparent how the function generator would operate with an AC normalized range signal ($R/Rn$) sin ($\omega t$) and an AC reference signal which would perform the same general function as the related AC signal to be described.

The breakpoint selector 1044 includes a plurality of operational amplifiers 1066, 1068 and 1070. Each operational amplifier has an inverting input terminal designated by the number 2, a noninverting input terminal designated by the number 3, and an output terminal designated by the number 6. A resistor 1072 is connected between the noninverting input and ground in order to minimize the bias current error inherent in operational amplifiers. Comparison circuits composed of resistors 1074 and 1076, 1078 and 1080, and 1082 and 1084 are respectively parallel coupled through switch 1050 between input terminal 1060 and the output terminal of inverter 1064 for respective reception and comparison of the normalized range signal ($R/Rn$) and the DC constant reference voltage. The respective junctions of the pairs of resistors contained in each comparison circuit are respectively coupled to the inverting inputs of operational amplifiers 1066, 1068 and 1070. Each of operational amplifiers 1066, 1068 and 1070 produces a negative output signal when a positive voltage is coupled to its inverting input. With a distant target, the range and hence the amplitude of the normalized range signal ($R/Rn$) is greater than with a close target. The size of the resistances 1074, 1076, 1078, 1080, 1082 and 1084 are chosen such that if the range progressively increases $R$ operational amplifier 1066 is turned on first; then with a further increase in range $R$ operational amplifier 1068 is turned on next; and with a still further increase in range $R$ operational amplifier 1070 is turned on last. These turn on points for the operational amplifiers are reached when the normalized range signal ($R/Rn$) reaches voltage $V_A$, voltage $V_B$, and voltage $V_C$, as indicated by points $a$, $b$, and $c$ in FIG. 6. When the voltage level $V_A$ is exceeded by the input normalized range signal ($R/Rn$), the output of operational amplifier 1066, which can be a Fairchild $\mu$A709 high performance operational amplifier, manufactured by Fairchild Semiconductor Corporation and described and illustrated in their handbook, Fairchild Semiconductor Linear Integrated Circuits, Application Handbook, 1967, goes low or negative. The output of operational amplifier 1066 is fed through resistor 1084 to the base terminal of a PNP transistor 1086 to turn on the transistor and cause the voltage drop across the collector resistor 1088 to change from a negative to a positive voltage. The signal taken off the collector of transistor 1086 will hereinafter be referred to as switching or breakpoint select signal $a$ and will be positive in potential at this time.

When the normalized range signal ($R/Rn$) exceeds the voltage level $V_B$, due to a further increase in the target range $R$, the output of operational amplifier 1068 goes low or negative. The output of operational amplifier 1068 is fed through resistor 1090 to the base terminal of a PNP transistor 1092 to turn on the transistor 1092 and cause the voltage drop across its collector resistor 1094 to change from a negative to a positive voltage. The signal taken off the collector of transistor 1092 will hereinafter be referred to as switching or breakpoint select signal $b$ and will be positive in potential at this time.

If the target range should further increase, the amplitude of normalized range signal ($R/Rn$) will also increase. When the normalized range signal ($R/Rn$) exceeds the voltage level $V_C$, as indicated by point $c$ in FIG. 6, the output of operational amplifier 1070 goes low or negative. The output of operational amplifier 1070 is fed through resistor 1096 to the base terminal of transistor 1098 to turn on the transistor 1098. Upon the conduction of transistor 1098 the voltage drop across the collector resistor 1100 changes from a negative to a positive voltage. The signal taken off the collector of transistor 1098 will hereinafter be referred to as switching or breakpoint select signal $c$ and will be positive in potential at this time.

These switching or break point select signals $a$, $b$, and $c$ are fed to the resistor network 1046 to selectively vary the gain of the operational amplifier 1048.

The resistor network 1046 includes a first set of parallel resistance branches 1102 which are coupled to receive the normalized range signal ($R/Rn$) and are responsive to the application of the breakpoint select signals $a$, $b$ and $c$ for setting the gain slope, or $a_i$ slope factor of the $a_ix$ term, of the nonlinear function $f_e(R/Rn)$ produced at the output of operational amplifier 1048. The ($R/Rn$) factor of the $a_ix$ (is the input analog voltage ($R/Rn$) which is applied through switch 1050 to resistor 1104 and to the source terminals of FET transistors 1106, 1108 and 1110. This input analog voltage ($R/Rn$), or ($R/Rn$) factor, in cooperation with the resistance presented to the inverting terminal of the operational amplifier 1048 by the first set of parallel resistance branches 1102, effectively results (through previously described circuit operation) in the production of the $a_ix$ term of the function $f_e(R/Rn)$ as produced at the output of operational amplifier 1048. The resistor network 1046 also includes a second set of parallel resistance branches 1112 which are connected in common to input terminal 1062 through switch 1050 for reception of the reference voltage, and are responsive to the application of the reference voltage and the breakpoint selector signals $a$, $b$ and $c$ to bias the projected gain slope level to intercept the coordinates of the function $f_e(R/Rn)$ at the points $a$, $b$ and $c$ of FIG. 6 which respectively represent the voltages $V_A$, $V_B$ and $V_C$. These coordinate intercepts determine the ordinate intercept points, or voltages, $b_2$, $b_3$, and $b_4$. The intercept voltage $b_1$ occurred before the breakpoint select voltage $V_A$, since it is part of the $a_ix + b_i$ equation of the first line segment. The production of the $b_i$ term (representing the intercept voltages $b_1$, $b_2$, $b_3$ and $b_4$) of the nonlinear function $f_e(R/Rn)$ at the output of operational amplifier 1048 is achieved by the circuit operation of the resistance presented to the inverting terminal of the operational amplifier 1048 by the second set of parallel resistance branches in cooperation with the reference voltages.

More specifically, when the amplitude of the input analog range voltage is less than that of breakpoint voltage $V_A$, only the slope set resistor 1104 and an intercept set resistor 1114 are connected to the input of operational amplifier 1048, since no positive point select signals $a$, $b$ or $c$ are received to turn on the junction FET transistors contained in the first set of parallel resistance branches 1102 and the second set of parallel resistance branches 1112. Therefore, the output of the operational amplifier 1048 will be described by the equation $f_e(R/Rn) = a_1x + b_1$ of the first line slope segment.

The operational amplifier 1048 includes an amplifier 1116 such as previously referenced $\mu$A709 and has a feedback resistor 1118 connected between its output terminal 6 and its inverting input terminal 2. In addition, the noninverting input terminal 3 is connected through resistor 1120 to the reference potential to minimize the bias current error inherent in operation amplifiers. The combination of the slope set resistor 1104 and the intercept set resistor 1114 operate as gain set resistances wherein the gain of the operational amplifier is proportional to the ratio of the resistance of the feedback resistor 1118 and the sum of the parallel resistances of the slope set resistor 1104 (operating on the input signal ($R/Rn$) and the intercept set resistor 1114 (operating on the reference voltage).

Figure 6:
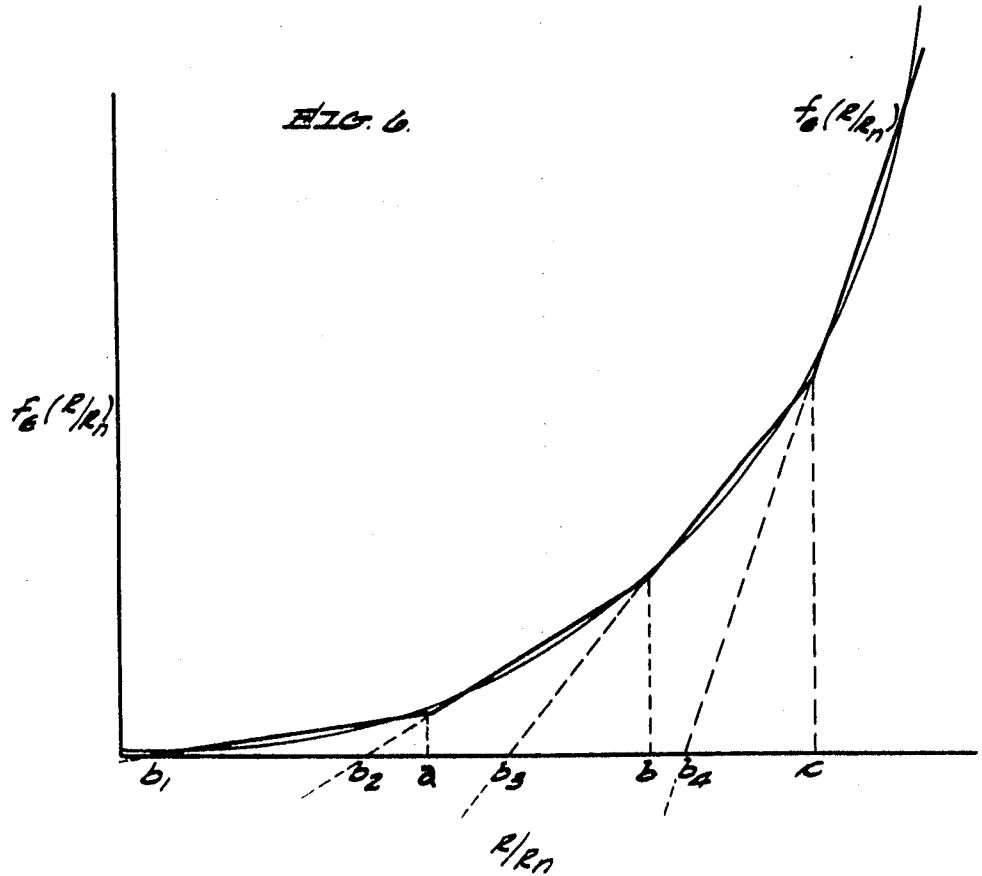
FIG. 6 is a diagram of one signal waveform produced by the function generator circuit of FIG. 5.

Under these conditions the function generator 956 will generate the first line segment illustrated in FIG. 6 until the increasing input analog voltage exceeds the voltage $V_A$ (represented by point $a$ in FIG. 6). When the amplitude of the input normalized range signal ($R/Rn$) exceeds the first breakpoint or switching voltage $V_A$, the positive switching, or breakpoint select, signal $b$ is produced by the breakpoint selector circuit 1044 and is fed through resistors 1122 and 1124 to the gate terminals of FET, transistors 1126 and 1128 in the first set of parallel resistors 1102 and the second set of parallel resistors 1112, respectively, to turn them on. The sum of the parallel resistances of resistor 1122 and the resistance branch, including the resistance between the source terminal and the drain terminal of turned-on FET transistor 1126 and resistance 1130 will effectively reduce the gain slope resistance of the operational amplifier 1048, thereby effectively increasing the slope of the second line slope segment between the voltage levels $V_A$ and $V_B$, designated as points $a$ and $b$ in FIG. 6. In addition, for the intercept set bias, the sum of the parallel resistances of resistor 1114 and the resistance branch including the resistance between the source terminal and the drain terminal of turned-on FET transistor 1128 and resistor 1132 operate on the reference voltage to bias the operational amplifier 1048 gain, so that a projection of the second line slope segment will intercept the ordinate of the graph in FIG. 6 at a predetermined point $b_2$.

Similarly, third line slope segment between breakpoint voltages $V_B$ and $V_C$, as represented by points $b$ and $c$ in FIG. 6, is produced when the breakpoint select signal $b$ changes from a negative potential to a positive potential and is applied through resistor 1134 to the base electrode of FET transistor 1136 and through resistor 1138 to the base electrode of FET transistor 1140, respectively. The positive switching or breakpoint select signal $b$ turns on FET transistors 1136 and 1140 so that their respective source to drain resistances and the resistance of resistors 1142 and 1144, respectively, are summed in parallel with the previously described resistance branches to respectively further reduce the gain slope resistance of the operational amplifier 1048, thereby effectively increasing the slope of third line slope segment between voltage level $V_B$ and $V_C$ (designated as points $b$ and $c$ in FIG. 6) and, in cooperation with the reference voltage, to further bias the operational amplifier 1048 gain so that a projection of the third line slope segment will intercept the ordinate of the graph in FIG. 6 at a predetermined point $b_3$.

The fourth line slope segment following the breakpoint voltage $V_C$, as represented by point $c$ in FIG. 6, is produced when the switching or breakpoint select signal $c$ changes from a negative voltage to a positive voltage and is applied through resistors 1146 and 1148 to the gate terminals of FET transistors 1150 and 1152, respectively, to turn them on. The resistance branch, including the resistance between the source terminal and the drain terminal of FET transistors 1150 and 1152 and the respective resistors 1154 and 1156 are respectively added in parallel to the previously described resistances to further increase the gain slope of the operational amplifier 1048 and to further bias the operational amplifier so that the fourth line slope segment, is so projected, would intercept the Y coordinate at a new intercept point $b_4$.

It should be emphasized that although a function generator which is capable of generating four line segments has been described, it is possible to increase the accuracy of the curve approximation of this function generator by adding additional comparison circuits, operational amplifier circuits and transistor circuits to the breakpoint selector 1044, and additional resistance branches in each of the first and second sets of parallel resistance branches 1102 and 1112 including FET transistors and the resistors, for each additional line segment desired. The generation of additional line segments at additional breakpoints would more closely approximate the desired smooth curve for which the function is required. The resulting output signal $f_e(R/Rn)$ on the output terminal of operational amplifier 1048 is approximately the function previously described in the equations.

The resulting output signal $f_e(R/Rn)$ on the output terminal of operational amplifier 1048 is received by the adjustable ballistic term multiplier 960 (FIG. 1A) wherein it is multiplied by the linear unnormalizing ballistics transfer function $\epsilon_{no}$. Structurally, the adjustable ballistics constant multiplier 960 is arranged the same as the adjustable ballistics term multiplier 954 illustrated in FIG. 2 with the exception that the value of the resistances 998–998$n$ and feedback resistor 1006 are selected in accordance with the unnormalizing transfer function $\epsilon_{no}$ for each type. The output signal from this adjustable ballistics constant multiplier 960 is proportional to superelevation $\epsilon_1$ in accordance with the previously described superelevation equations.

The ballistics function generator 958 for generating the nonlinear ballistic function $f_t(R/Rn)$ and the adjustable ballistic term multiplier 962 for multiplying the nonlinear function signal by the unnormalizing ballistic term or linear unnormalizing transfer function $t_{no}$ illustrated in FIG. 1A are embodied in the same way as the ballistic function generator 956 of FIG. 5 and the adjustable ballistic term multiplier 954 of FIG. 2, respectively, with the exception that the resistances of the resistors therein are selected so that the resultant ballistic function signal output $t_f$ will closely approximate the smooth curve and expression represented by time of flight equations for generating the partially corrected time of flight signal $t_{f1}$.

As previously described with reference to FIG. 1B the partially corrected superelevation signal $\epsilon_1$ and the partially corrected time of flight signal $t_{t_1}$ are each fed through a pair of slave multipliers to further correct for nonstandard conditions in accordance with the partial derivatives $B$ and $H$. More specifically, the partially corrected superelevation signal $\epsilon_1$ is fed through the slave multiplier 972, the operational amplifier 974, the slave multiplier 976 and the operational amplifier 978 to produce the superelevation output signals $\epsilon$ for nonstandard conditions:

$$\epsilon = \epsilon_1(1+B)(1-2H)$$

where $$B=(\Delta Rn)/(Rn) \text{ and}$$
$$H=(\Delta Vo)/(Vo)$$

The partially corrected time of flight signal $t_f$ is fed through the slave multiplier 980, the operational amplifier 982, the slave multiplier 984 and the operational amplifier 986 to produce the time of flight output signal $t_{t_1}$ for nonstandard conditions:

$$t_f = t_{t_1}(1+B)(1-H)$$

where $$B=(\Delta Rn)/(Rn)$$
$$H=(\Delta Vo)/(Vo)$$

These four slave multipliers 972, 976, 980 and 984 are all implemented the same way as the slave multiplier 966 as illustrated in FIG. 3. The master multiplier 970 for driving the slave multipliers 976 and 984 is implements in the same manner as master multiplier 964 illustrated in FIG. 3.

The parallax correction signal $p$ is produced by the function generator 990, rectifier 992 and breakpoint selector 994 which are implemented in the same manner as the circuits of FIG. 5. Since, however, the function of parallax $Dp=((1/R)-(1/R_c))$ is inversely proportional to range it is generated as the function generator decreases the number of parallel resistance branches as the range increases, which is just opposite of the mode of operation described with reference to FIG. 5.

Referring back to the circuit of FIG. 1B, the elevation control signals $E$ and deflection control signals $D$ for driving the fire control system in elevation and deflection, respectively, are generated in response to the superelevation signal $\epsilon$ and time of flight signal $t_f$ which have been corrected for ballistic drift angle $\eta_d$, wind deflection angle $\eta_w$, angular turret rate $\eta_k$, parallax $p$, jump $D_j$, $E_j$ and droop $Ed-Dd$.

The superelevation signal $\epsilon$ is fed through a ballistic term multiplier 1160 of the type illustrated in FIG. 2 wherein it is multiplied by a selected ballistic drift constant $K_d$ for each selected ammunition and can include an in-line partial multiplier of the previous type to generate a drift angle signal $\eta_d$ in accordance with the previously described equation. This drift angle signal $\eta_d$ is then fed to one summing input of an operational amplifier 1162 whereafter the circuit will utilize this ballistic drift angle signal to correct the elevation control signal $E$ and the deflection control signal $D$ as will be explained in more detail shortly.

The crosswind signal $V_w$ received from a wind sensor is fed through a variable ballistic term multiplier 1164 of the previously described type wherein it is multiplied by a crosswind coefficient $K_w$ for each selected ammunition to generate the signal $V_w K_w$. This signal is then fed through a slave multiplier 1166 of the type illustrated in FIG. 3 wherein it is multiplied by the temperature-pressure correction coefficient $B$ to generate an output signal $V_w K_w B$ which is fed to an inverting input of a summing operational amplifier 1168. The signal $V_w K_w$ is also fed directly to a noninverting input of the operational amplifier 1168 wherein the output signal $V_w K_w(1-B)$ is produced to correct for nonstandard conditions. This signal is fed through a slave multiplier 1170 wherein it is multiplied by the time of flight signal $T$ ($T = t_f$) when a right lead lock input signal R$t$LL from a hand control of the operator is on to produce the wind deflection angle signal $\eta_w$ which is fed to a second input of the summing operational amplifier 1162 whereafter it is used to correct the deflection signal $D$ and the elevation signal $E$.

The time of flight multiplication factor $T$ for the slave multiplier 1170 is produced when the time of flight signal $t_f$ is fed to the master multiplier 988. The master-slave time division multiplier 998–1170 are of the type illustrated in FIG. 3 and described above and can be operated with an AC input signal $e_m = t_f \sin \omega t$ received by the master multiplier 988 and a DC input signal $V_w K_w$ received by the slave portions 1170. As previously stated, the period of the AC signal $t_f \sin \omega t$ must be many times longer than the duration of the duty cycle of the master multiplier 988. As a result, the master portion will operate substantially as described above for a DC input signal for any particular duty cycle.

However, when the input signal $t94$ f sin $\omega t$ is an AC signal, the output $(t_f \sin \omega t)/e_d = (T_2 - T_1)/(T_2 + T_1)$ of the master portion 988 will change from duty cycle to duty cycle giving a pulse-width-modulated output signal. For example, for an input of $e_m = t_f \sin 0°$, no $e_m$ current will be applied to the summing integrator 1024 and the output signal will be a rectangular wave where $T_1 = T_2$. As the $t_f \sin \omega t$ signal increase from sin 0° to sin 90°, the time $T_2$ increase until the duration of $T_1$ is very short with respect to time $T_2$. When the $t_f \sin \omega t$ signal changes through its period from sin 90° to sin 270°, the duration of $T_1$ will increase until $T_2$ is short with respect to $T_1$. As the $t_f \sin \omega t$ signal changes from sin 270° to sin 360°, the duration $T_2$ will increase and the duration of $T_1$ will decrease until a square wave output signal in which $T_1 = T_2$ results. The output of the master portion 988 will change as described above for each cycle of $e_m$. $T$ *The first slave switch 1034 and the second slave switch 1036 receive the output T of the master portion 988* as described above and provide an output signal at their common outputs corresponding to the pulse-width-modulated output of the master portion 988. The outputs of the first slave switch 1034 and the second slave switch 1036 are applied to an averaging filter 1042 to produce a filtered output signal that can be represented by the following relationship:

$$(V_w K_w(1-B)) t_f \sin \omega t)/e_d$$

The waveforms A through F illustrated in FIG. 4 are applicable to the master-slave time division multiplier for an AC signal $t_f \sin \omega t$ applied to the master portion 988 and a DC signal $V_w K_w(1-B)$ applied to the slave portion 1170.

The angular rate in azimuth $\omega_1$ of the turret is fed through a follow and clamp circuit 1172 wherein it is stored as a DC signal when the right lead lock input signal R$t$LL is received.

A typical follow and clamp circuit operable to sample $\omega_e$ or $\omega_1$ (FIG. 1B) in a disturbed or nondisturbed fire control system is illustrated in FIG. 7 and includes a switch 1182 responsive to a DC signal $\omega_1$. An amplifier 1184 has an input coupled to ground through a suitable resistor 1186 and coupled through a resistor 1188 to the switch 1182. Also, the output of the amplifier 1184 is coupled through a series-connected feedback resistor 1190 and switch 1192 to the input thereof as well as being coupled through a capacitor 1194 to the output of the amplifier. The switches 1188 and 1192 are respectively responsive to switch control units 1198 which is responsive to the right lead lock control signal R$t$LL. The switches 1188 and 1192 are closed for filter operation and are opened for hold operation when the right lead lock signal R$t$LL is terminated, this condition being for disturbed and nondisturbed operation. For director operation, the switches 1188 and 1192 remain closed as shown so that filter action is provided. For all mechanizations, switch 1198 is closed in the absence of an R$t$LL signal. When utilizing the sample and hold circuit release of the R$t$LL, switch 1198 causes the switches 1182 and 1192 to open so that the operator-selected angular target-tracking rate is stored as a DC signal $\omega_1$.

This DC signal is then fed through a slave multiplier 1174 of the type previously described wherein it is multiplied by the time of flight signal $T$ to generate a kinematic lead angle signal $\omega_1 T$. If it is a one-gyro system, this kinematic lead angle signal $\omega_1 T$ is fed through an analog switch 1176a as a single-gyro kinematic lead angle signal $\eta_k$ to another input of the operational amplifier 1162 for correcting the deflection signal $D$ and elevation signal $E$.

Figure 8:
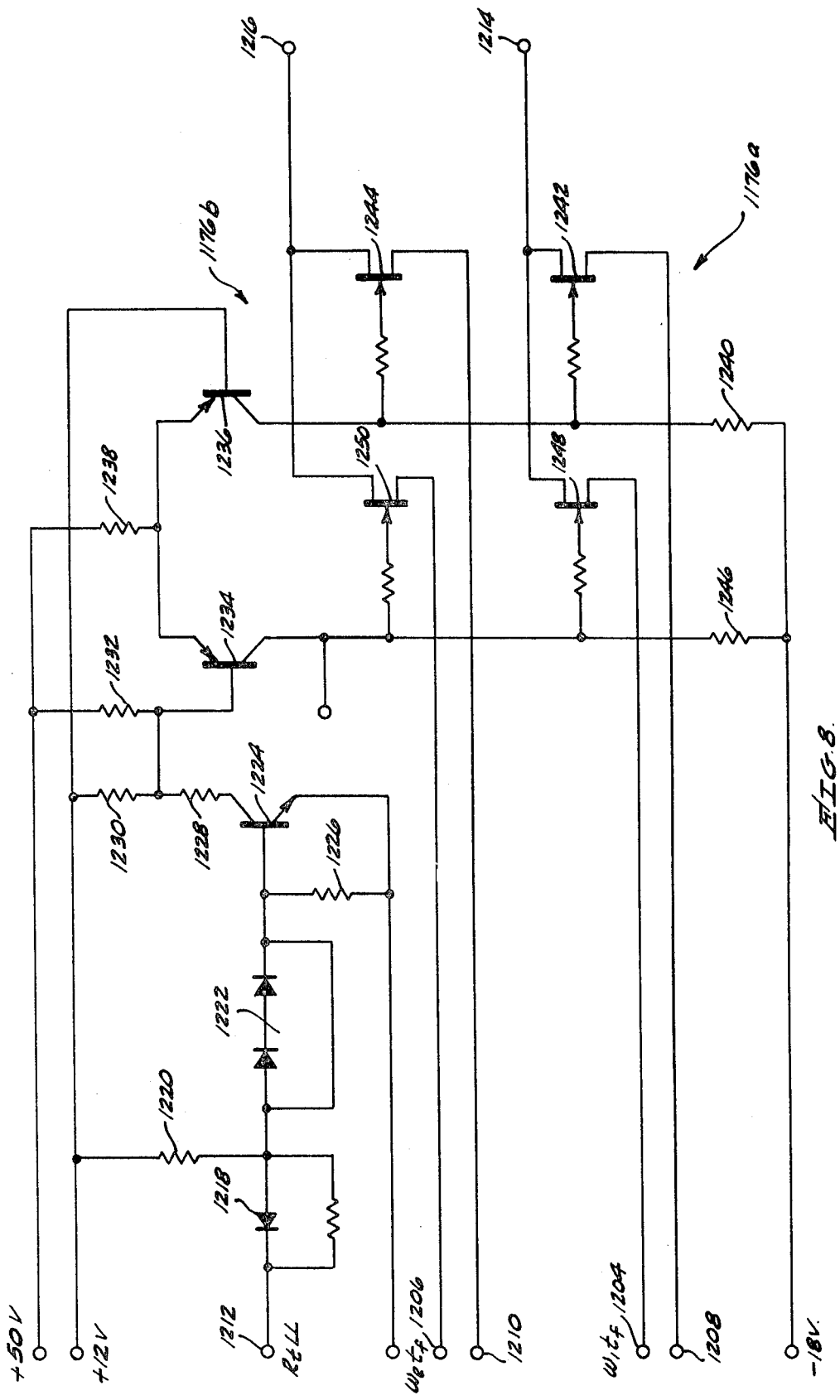
FIG. 8 is an analog switch of the type used in the computer circuit of FIG. 1B.

The analog switches 1176a and 1176b illustrated in FIG. 8 receive the single-gyro kinematic lead angle signal $\eta_k = \omega_1 t_f$ at one input terminal 1204 and the optional second gyro kinematic lead angle signal $\omega_e t_f$, as will be explained in more detail subsequently, at a second input terminal 1206. The other two input terminals 1208 and 1210 are connected to a ground terminal. A switch signal R$t$LL is received at an input terminal 1212. This switch signal R$t$LL is normally at a low level when the computer is not in a COMPUTE mode, so that the inputs at terminals 1208 and 1210, which are at ground level, are coupled to the output terminal 1214 and 1216, respectively.

More specifically, when the switch signal R$t$LL applied to terminal 1212 is low, the interface diode circuit 1218 is forward biased so that one end of the base current resistor 1220 is at the ground level. This ground level signal is fed through the threshold circuit 1222, including two series diodes to reverse bias an NPN transistor 1224 off. In addition, a base emitter resistor 1226 is connected between the base terminal of the transistor 1224 and its emitter terminal. A biasing network including resistors 1228 and 1230 connected between the emitter terminal and a +12v. terminal and a resistor 1232 are connected between the +12v. terminal and the +50v. level terminals at one end and the base terminal of transistor 1234 to maintain the base terminal voltage at around 12v. ±ΔV, depending upon the state of transistor 1224. For example, with transistor 1224 in its normally off condition, the level of the signal applied to the base terminal of transistor 1234 is above +12v. and reverse biases the transistor 1234 which is part of a differential amplifier circuit. With the transistor 1234 turned off, the other transistor 1236 of the differential amplifier is forward biased on as a result of the voltage level at the emitter terminal, resulting from current flow through a current source resistor 1238 and the potential developed across the collector resistor 1240.

With the differential amplifier in this state, the junction FET transistors 1242 and 1244 are turned on by a signal applied to the gate terminals from the collector terminal voltage developed across collector resistor 1240. With the FET transistors 1242 and 1244 turned on, the ground level signal received at the input terminals 1208 and 1210 is conducted through the source and drain terminals of FET transistors 1242 and 1244 to the output terminals 1214 and 1216, respectively. Since transistor 1234 of the differential amplifier is turned off, the voltage drop across a collector resistor 1246 is low, resulting in a low voltage level signal which is applied to the gate terminals of the FET transistors 1248 and 1250, thereby turning them off. As a result, the input signals $\omega_1 t_f$ and $\omega_e t_f$ applied to the input terminals 1204 and 1206 cannot be conducted to the output terminals 1214 and 1216, respectively.

When the switch signal R*t*LL applied to input terminal 1212 goes high, the interface resistor circuit 1218 is back biased, thereby raising the level of the signal at the lower end terminal of base current resistor 1220. This signal level is fed through the threshold circuit 1222 to forward bias the transistor 1224 to an on condition. When transistor 1224 goes on, current flow through the bias network, including resistors 1228, 1230 and 1232, causes the signal to the base terminal of transistor 1234 to go lower than +12v., thereby turning on transistor 1234.

With the transistor 1234 of the differential amplifier turned on, the other transistor 1236 is turned off. Consequently, the voltage drop across collector resistor 1246 increases, and the voltage drop across collector resistor 1240 decreases. As a result, the collector voltage of transistor 1234 is fed to the gate terminal of FET transistors 1248 and 1250 to turn them on, whereupon the input signal $\omega_1 t_f$ and $\omega_e t_f$ are conducted through the source and drain terminals of the FET transistors to the output terminals 1214 and 1216, respectively. The decrease in the voltage at the collector terminals of transistor 1236 is applied to the gate terminals of the FET transistors 1242 and 1244 to turn them off, whereupon the ground level signal applied to the input terminals 1208 and 1210 cannot be conducted to the output terminal.

The output signal $\beta$ of the operational amplifier 1162 (FIG. 1B) then becomes $\beta = \eta_d + \eta_w + \eta_k$. If, however, it is a two-gyro system, switch contacts of single gyro switch 1178 are switched and then this kinematic lead angle signal $\omega_1 t_f$ is fed to an input of operational amplifier 1180 whereupon the signal $\beta$ becomes $\eta_d + \eta_w$.

The superelevation signal $\epsilon$ is also fed directly to the input of an operational amplifier 1252 to produce an output signal $\alpha$ where:

$$\alpha = \epsilon$$

These output signals $\beta$ and $\alpha$ from the operational amplifiers 1162 and 1252 can be fed directly through analog switches 1254a and 1254b of the previously described type to an input of the operational amplifiers 1180 and 1257, respectively, when the cant resolver signal C is at the off level. If the cant signal C is on, it can be first fed through a cant resolver 1256 before being fed through the analog switches 1254a and 1254b to the inputs of the operational amplifiers 1180 and 1257, respectively, when the cant resolver is turned on. Although a cant resolver is specifically referred to, it should be understood that other types of resolvers could be used instead.

Assuming that the cant resolver 1256 is in operation, the output signals $\alpha$ and $\beta$ from the operational amplifiers are fed to one winding thereof and are resolved into turret coordinates which take into account the incline angle of the turret relative to the horizontal and produces output signals which are resolved in accordance with this cant angle. One way to perform this operation would be to have a first winding which is connected to a pendulum so that the first winding is moved relative to a stationary second winding, whereupon the inductive coupling between the legs of the windings will vary with the position of the movable winding. The output signal of the cant resolver 1256 then becomes an uncorrected deflection signal $D'$ and an uncorrected elevation signal $E'$ where:

$$D' = -\beta \cos C + \alpha \sin C$$

and $$E' = \alpha \cos C + \beta \sin C$$

These uncorrected deflection and elevation signals $D'$ and $E'$ are then fed through the analog switches 1254a and 1254b, respectively, to an input of the summing inputs of operational amplifiers 1180 and 1257, respectively, wherein they are further corrected. Another input of the operational amplifiers 1180 and 1257 receives Jump signals $D_j$ and $E_j$, respectively, which are produced by the variable attenuators 1258 and 1260, respectively, for each selected ammunition. Another input of the operational amplifiers 1180 and 1257 receives the parallax coefficient $(1/R - 1/R_c)$ generated by the function generator 990 of FIG. 1A. Another input to the operational amplifiers is gun barrel droop in deflection $Dd$ and elevation $Ed$. The input terminals of operational amplifier 1180 has a gain set resistor therein which multiplies the parallax coefficient by the deflection parallax constant $D_{pd}$ determined for each tank. The operational amplifier 1257 has a gain set resistor associated with the input thereof which effectively multiplies the parallax coefficient by the elevation parallax constant $D_{pe}$ determined for each tank. If the system is a two-gyro system, the angular turret rate in elevational signal $\omega_e$ times time of flight signal $\omega_e t_f$ is fed to another input of the operational amplifier 1257 to compensate for the kinematic lead angle in elevation.

When the two-gyro system embodiment is being used (FIG. 1B), the angular gun line rate in elevation signal $\omega_e$ is fed to a second follow and clamp circuit 1262 of the type previously described with reference to FIG. 7 which stores it as a DC signal $\omega_e$. This DC signal $\omega_e$ is fed through a slave multiplier 1264 of the type previously described wherein it is multiplied by the time of flight signal $T$ to produce an output signal $\omega_e t_f$ which is the kinematic lead angle in elevation. This kinematic lead angle in elevation $\omega_e t_f$ is fed through the analog switch 1176b and SG switch 1178 to an input of operational amplifier 1257 and the kinematic lead angle in deflection $\omega_1 t_f$ is fed through SG switch 1178 to an input of the operational amplifier 1180 in the deflection channel.

The outputs of the operational amplifiers 1180 and 1257 are fed through the analog switches 1278a and 1278b of the previously described type which will conduct the signals only when the COMPUTE signal is received by them.

Operational amplifiers 1280 and 1282 receive the output signals from the analog gates 1278z and 1278b, respectively, along with a boresight correction signal $Db$ in deflection and a boresight correction signal $Eb$ in elevation, respectively. These operational amplifiers 1278a and 1278b generate the deflection correction signal $D$ and elevation correction signal $E$ which are fed to a servo amplifier.

Although the invention has been embodied within a ballistic computer, the invention is not necessarily limited to ballistic computers but could be used in other types of circuits including function generator circuits and control circuits with other types of multiplier circuits, function generators, etc.

Furthermore, while the salient features have been described with respect to a particular embodiment, it should be readily apparent that other modifications can be made within the spirit and the scope of the invention and it is therefore not desired to limit the invention to the exact details shown and described.

What is claimed is:

1. An in-line partial derivative multiplication circuit comprising:
   first channel means for conducting an analog signal related to a function of at least one predetermined condition;
   second means being operably coupled to receive the analog signal from said first channel means for multiplying the analog signal by a factor related to the first-order linear approximation of the ratio of small order changes in at least one of the predetermined conditions relative to the predetermined condition to produce a product signal; and
   third means coupled to receive the analog signal from said first channel means and to receive the product signal from said second means for summing the product signal and the analog signal to produce a corrected analog signal corresponding to a first-order partial derivative approximation for change in the predetermined conditions.

2. The circuit of claim 1 in which said second means includes a multiplier circuit coupled to receive the signal related to the ratio of change in a predetermined condition to the predetermined condition and to receive the analog signal for multiplying the signals together to produce a product signal; and said third means includes a summing circuit coupled to said multiplier circuit for receiving the product signal and coupled to said first channel means for conducting the analog signal for receiving the analog signal said summing circuit being operable to sum a signal proportional to the received product signal and the analog together to produce a summed signal corresponding to a first-order partial derivative of the analog signal for the change in the predetermined condition.

3. The circuit of claim 2 in which said first channel means for conducting an analog signal includes an operational amplifier means coupled to receive an input signal for producing a function signal $f(u_o)$ for a standard condition $u_o$ in response thereto where $u_o$ is a symbolic representation of the general case of any standard condition.

4. The circuit of claim 1 in which said second means includes a master multiplier and slave multiplier, said master multiplier being responsive to an input signal related to the ratio of change in at least one predetermined condition to the predetermined condition for producing an output signal related thereto, and said slave multipliers being responsive to the output signal from said master multiplier and the analog function signal for multiplying the analog function signal by the output signal of said master multiplier to produce the product signal.

5. The circuit of claim 1 in which said third means includes means for producing a signal related to a constant $k \geq 1$ times the ratio of changes in predetermined conditions $\Delta u$ to the predetermined conditions $u_o$ where $u_o$ is a symbolic representation of a general case of a predetermined condition of the condition $u$.

6. The circuit of claim 1 in which the function is $f(u)=u^k$, where $u_o$ is a symbolic representation of a function for a general case of a predetermined condition and $k$ is a numerical representation greater than or equal to 1 and said second means includes means for producing a product signal $f(u)k((\Delta u)/_o)$ related to the constant $k$ times the ratio of changes in predetermined condition $\Delta u$ to the predetermined condition $u_o$.

7. A circuit comprising:

channel means for conducting a function signal having plurality of variables, said means having an input end and an output end; and a plurality of partial derivative multiplier means coupled in series circuit relationship with one another between said input end and said output end of said channel means each partial derivative multiplier means having an input terminal coupled to receive the function signal and a multiplier circuit coupled to said input terminal for multiplying the received function signal by the ratio of change in individual ones of the plurality of conductions to predetermined corresponding ones of the plurality of conditions to produce a product signal on an output means, and a summing circuit coupled to said input terminal to receive the function signal and being further coupled to the output terminal of an individual multiplier circuit for receiving the product signal, and having an output terminal coupled to the input terminal of any adjacent following individual one of said plurality of partial derivative multiplier means.

8. In a circuit channel comprising:

function generator means for producing at least the function signal $f(u,v)$ where $f(u)=u^k$, $f(v)=v^l$ where $u$, $k$, $v$, and $l$ are symbolic representations of general case conditions;

first means coupled to receive the function signal for multiplying the function signal $f(u,v)$ by the first ratio of change signal $((\Delta u)/u_o)$ where $\Delta u$ is the change in a condition $u$ from a standard condition $u_o$ to produce the product signal $f(u,v)(\Delta u)/u_o)$;

second means coupled to receive the function signal and the product signal for summing the function signal $f(u,v)$ with the product signal $f(u,v)(\Delta u)/u_o)$ to produce a summed signal $f(u,v(1+k((\Delta u)/u_o)$ ;

third means coupled to receive the summed signal from said second means for multiplying the summed signal $f(u,v)(1+k((\Delta u)/u))$ by the second ratio of change signal $(\Delta v)/v$ where $\Delta v$ is a change in the condition $u$ from a standard condition $u_o$ to produce the second product signal $f(u,v)(1+k((\Delta u)/u))(\Delta v)/v$; and fourth means coupled to receive the second product signal from said third means and to receive the summed signal from said second means for summing the second product signal with the received summed function signal to produce a summed signal $f(u,v)(1+k((\Delta u)/u)(1+l((\Delta v)/v)$ which is corrected for the effects of changes in the standard conditions.